(12) United States Patent
Kimata et al.

(10) Patent No.: US 11,183,154 B2
(45) Date of Patent: Nov. 23, 2021

(54) IMAGE DISPLAY SYSTEM, DISPLAY CONTROL DEVICE, AND METHOD FOR CONTROLLING DISPLAY

(71) Applicant: Panasonic Intellectual Property Management Co., Ltd., Osaka (JP)

(72) Inventors: Teruyuki Kimata, Tokyo (JP); Hideyuki Yamada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/891,479

(22) Filed: Jun. 3, 2020

(65) Prior Publication Data

US 2020/0388248 A1 Dec. 10, 2020

(30) Foreign Application Priority Data

Jun. 5, 2019 (JP) .............................. JP2019-105616

(51) Int. Cl.
*G09G 5/00* (2006.01)
*G09G 5/377* (2006.01)
*G09G 5/38* (2006.01)

(52) U.S. Cl.
CPC .............. *G09G 5/377* (2013.01); *G09G 5/38* (2013.01); *G09G 2354/00* (2013.01); *G09G 2370/16* (2013.01)

(58) Field of Classification Search
CPC .... G06F 3/0481; G06F 3/1454; G06F 3/0484; G06F 3/1462; G06F 3/1423; G06F 2203/04803; G09G 2340/0407; G09G 2370/16; G09G 2340/0442; G09G 2340/0464; G09G 2370/22; G09G 2340/04; G09G 2340/0435; G09G 2370/04; G09G 2370/20; G09G 5/377; G09G 5/38
See application file for complete search history.

(56) References Cited

U.S. PATENT DOCUMENTS

| | | |
|---|---|---|
| 2004/0130568 A1 | 7/2004 | Nagano et al. |
| 2010/0064260 A1* | 3/2010 | Amano ................. G06F 3/1438 715/859 |
| 2010/0095241 A1 | 4/2010 | Nagano et al. |
| 2010/0162127 A1* | 6/2010 | Uchino ................. G06F 3/1454 715/740 |
| 2014/0115528 A1 | 4/2014 | Nagano et al. |

(Continued)

FOREIGN PATENT DOCUMENTS

JP 2004-54134 2/2004

*Primary Examiner* — Hau H Nguyen
(74) *Attorney, Agent, or Firm* — Wenderoth, Lind & Ponack, L.L.P.

(57) ABSTRACT

An image display system includes a plurality of terminals each having a first screen and a display control device that controls a display device including a second screen. The plurality of terminals each transmit to the display control device an image of an active window on the first screen and image supplemental information including image position information indicating a position of the image on the first screen. The display control device receives the image and the image supplemental information, determines a position of the image on the second screen based on the image supplemental information, and causes the image to be displayed at the position determined on the second screen.

9 Claims, 17 Drawing Sheets

(56) References Cited

U.S. PATENT DOCUMENTS

2017/0024031 A1* 1/2017 Ueda ............... G06F 3/1454
2018/0061288 A1* 3/2018 Kubota ............. G09G 5/14
2018/0246604 A1* 8/2018 Lee ............. H04N 21/41407

* cited by examiner

IMAGE DISPLAY SYSTEM, DISPLAY CONTROL DEVICE, AND METHOD FOR CONTROLLING DISPLAY

BACKGROUND

1. Technical Field

The present disclosure relates to an image display system, a display control device, and a method for controlling display.

2. Description of the Related Art

A device is used in which an image displayed on a display screen of a terminal such as a personal computer is transmitted to an external display device and is displayed. Patent Literature (PTL) 1 discloses a network-accessible display device connected, via a network, to a plurality of terminal devices each having a screen capture function. The display device can perform multi-screen display by receiving, on a communication unit, captured image data transmitted from terminal devices having a screen capture function and by combining, on a display controller, the captured image data into image data of one screen by screen separation.

PTL 1: Unexamined Japanese Patent Publication No. 2004-54134

SUMMARY

The present disclosure provides an image display system, a display control device, and a method for controlling display that enable images captured on a plurality of terminals to be displayed appropriately.

An aspect of the present disclosure provides an image display system including a plurality of terminals each having a first screen and a display control device that controls a display device including a second screen. The plurality of terminals each transmit to the display control device an image of an active window on the first screen and image supplemental information including image position information indicating a position of the image on the first screen. The display control device receives the image and the image supplemental information, determines a position of the image on the second screen based on the image supplemental information, and causes the image to be displayed at the position determined on the second screen.

An aspect of the present disclosure provides a display control device including a display controller that controls a display device. The display controller obtains from each of a plurality of terminals an image of an active window on a first screen of each of the plurality of terminals and image supplemental information including image position information indicating a position of the image on the first screen, determines a position of the image on a second screen of the display device based on the image supplemental information, and causes the image to be displayed at the position determined on the second screen.

An aspect of the present disclosure provides a method for controlling display of an image by a display device. The method including obtaining from each of a plurality of terminals an image of an active window on a first screen of each of the plurality of terminals and image supplemental information including image position information indicating a position of the image on the first screen, determining a position of the image on a second screen of the display device based on the image supplemental information, and causing the image to be displayed at the position determined on the second screen.

The present disclosure enables images captured on a plurality of terminals to be displayed appropriately.

DETAILED DESCRIPTION

In the following, exemplary embodiments will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid the following description from being unnecessarily redundant and to help those skilled in the art to easily understand the exemplary embodiments. Note that the accompanying drawings and the following description are provided to help those skilled in the art to sufficiently understand the present disclosure, and are not intended to limit the subject matter of the claims.

(Circumstances Leading Up to a First Exemplary Embodiment)

There is proposed an image display system in which, for example, an image on a display screen of a terminal such as a personal computer (PC) or the like is output to a display device having a large screen to be displayed in a meeting room or other places so that the image can be seen by a plurality of people. Assuming a case where such a type of image display system is used when a plurality of people have a meeting, a conventional system generally displays an image from one terminal on a display device for a plurality of users attending the meeting to share the displayed image. Therefore, processing and operation are cumbersome, for example, it is necessary to switch between images from a plurality of terminals. Further, when displaying images from a plurality of terminals on a display device by multi-screen display, a conventional system divides the display area in a screen separation manner to display the plurality of images. Therefore, it is sometimes impossible to display a plurality of images appropriately depending on use conditions and users' demands. In the image display system that displays images from a plurality of terminals to share the images between a plurality of people as described above, a further improvement about a display form is required.

In the following, a description will be given on an example of an image display system or the like in which images captured by a plurality of terminals are transmitted to a display device and a plurality of images are displayed on a display screen of the display device, being laid out appropriately depending on situations.

First Exemplary Embodiment

Figure 1:
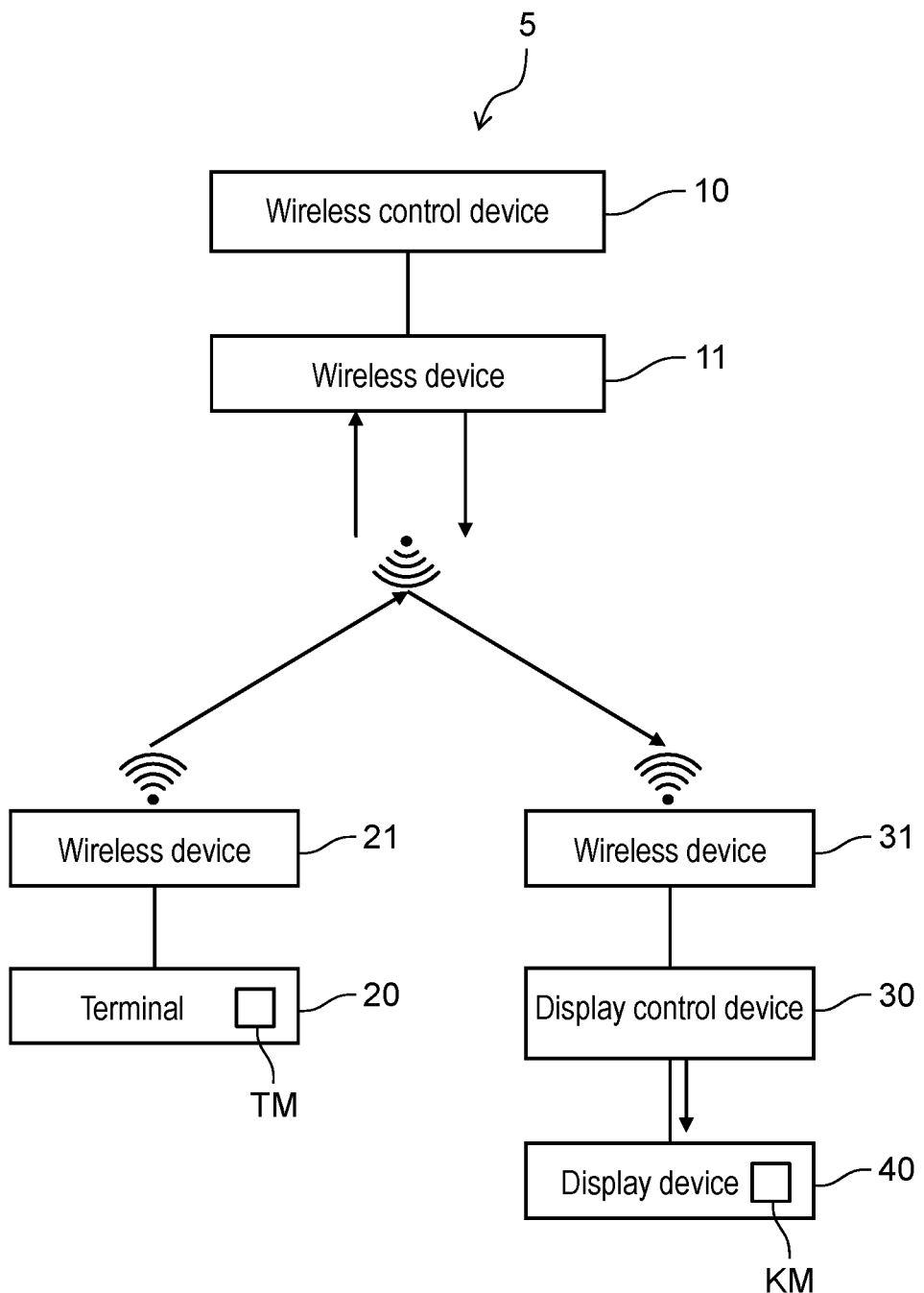
FIG. 1 is a block diagram showing a configuration example of an image display system according to a first exemplary embodiment.

FIG. 1 is a diagram showing a configuration example of image display system 5 according to an exemplary embodiment. In the following, a description will be given on a configuration example in which image display system 5 is provided in a public area such as a meeting room of an office.

Image display system 5 includes wireless control device 10, a plurality of terminals 20, display control device 30, and display device 40.

Wireless control device 10 controls communications between terminals 20 and display control device 30. Wireless control device 10 functions, for example, as a router. Wireless control device 10 may operate as a controller of an access point (AP) of WiGig (registered trademark), for example. Wireless control device 10 is disposed in a predetermined area (for example, an office room or a meeting room) and is installed on a ceiling in the area, for example. In the predetermined area, there can be terminal 20. Wireless control device 10 may have a communication unit (for example, a wireless communication unit), a controller, a storage, and the like in a similar manner to a common wireless communication control device.

Wireless control device 10 includes wireless device 11. Wireless device 11 is provided on wireless control device 10 as a built-in or external communication device. Wireless device 11 includes: a signal transmission and reception unit that transmits and receives signals in accordance with, for example, a predetermined communication method (for example, WiGig); and a communication controller that controls transmission and reception of the signals by the signal transmission and reception unit. Wireless device 11 may be a wireless communication unit of a WiGig (registered trademark) AP. In other words, wireless device 11 may operate as the communication unit of wireless control device 10.

Wireless device 11 transmits and receives, for example, a WiGig wireless signal. Wireless device 11 may transmit and receive a signal related to establishing a communication link between terminal 20 and display control device 30 Wireless device 11 may receive information (for example, identification information or position information of terminal 20) about terminal 20 from terminal 20 and may transmit information (for example, identification information or position information of wireless control device 10) about wireless device 11 to terminal 20. Wireless device 11 may receive information (for example, identification information or position information of display control device 30) about display control device 30 from display control device 30 and may transmit information (for example, identification information or position information of wireless control device 10) about wireless device 11 to display control device 30. Wireless device 11 wirelessly communicates with wireless device 21 connected to terminal 20 and wireless device 31 connected to display control device 30 and can communicate various types of data, information, and images and the like.

Wireless device 11 may control a radiation pattern (beamforming) for transmitting and receiving a signal. In this case, wireless device 11 may perform a control of beam forming training (BFT) to determine beams, out of beams in a plurality of directions, to be used for terminal 20 and display control device 30. Wireless device 11 may control transmission and reception of signals with terminal 20 and display control device 30 by using the beams determined by the BFT.

When controlling the radiation pattern, wireless device 11 may detect a position of wireless device 21, that is, a position of terminal 20 to which wireless device 21 is connected. Wireless device 11 may obtain the position of terminal 20 from a direction of the beam used for terminal 20 and a distance to terminal 20 estimated on the basis of the signal received from terminal 20. In this case, terminal information obtained from terminal 20 does not have to contain the information on the position of terminal 20. That is, wireless control device 10 can locate the position of terminal 20 to which wireless device 21 is connected. Further, wireless device 11 may detect a position of a user of terminal 20 (for example, a sitting position), a position of display control device 30, and the like in a similar manner to the position of terminal 20.

Terminal 20 is configured with an information processing device such as a PC, a smartphone, or a tablet terminal, and has a display unit to display image information, so that terminal 20 can display various types of information, being operated by a user. Terminal 20 includes the display unit, and the display unit has a display screen (terminal screen TM). Terminal 20 executes a client application for screen-sharing by using a display screen of display device 40 (shared screen KM).

Terminal 20 is connected to wireless device 21 that performs wireless communication. Wireless device 21 is provided on terminal 20 as a built-in or external communication device. Wireless device 21 may be a dongle for, for example, WiGig (registered trademark) communication. The configuration and the function equipped on wireless device 21 may be the same as the configuration and the function equipped on wireless device 11. Wireless device 21 may operate as the communication unit of terminal 20.

Display control device 30 controls display on the display screen (shared screen KM) of the display unit of display device 40. Display control device 30 may be, for example, an HDMI (registered trademark) converter. Display control device 30 is connected to display device 40 via wired or wireless connection (for example, an HDMI cable). Display control device 30 executes a server application for screen-sharing by using a display screen of display device 40 (shared screen KM).

Display control device 30 is connected to wireless device 31 that performs wireless communication. Wireless device 31 is provided on display control device 30 as a built-in or external communication device. Wireless device 31 may be, for example, a WiGig interface provided on the HDMI converter. The configuration and the function equipped on wireless device 31 may be the same as the configuration and the function equipped on wireless device 11. Wireless device 31 may operate as the communication unit of display control device 30.

Display device 40 has, for example, a liquid crystal display or an organic electro luminescent (EL) display. Display device 40 includes a display unit, and the display unit has a display screen (shared screen KM). Not shown in the drawing, display device 40 may have a communication unit, a controller, a storage, and the like in a similar manner to a common display device. Display device 40 may be installed in a meeting room or other places.

Display device 40 simultaneously displays a plurality of images (for example window images) from a plurality of terminals 20 on shared screen KM, following a display control by display control device 30.

Note that although it has been exemplified that wireless control device 10, terminal 20, and display control device 30 perform wireless communication (for example, WiGig communication) via wireless devices 11, 21, 31, the present disclosure is not limited to this example. For example, wireless communication other than WiGig may be used, or wired communication may be used.

Figure 2:
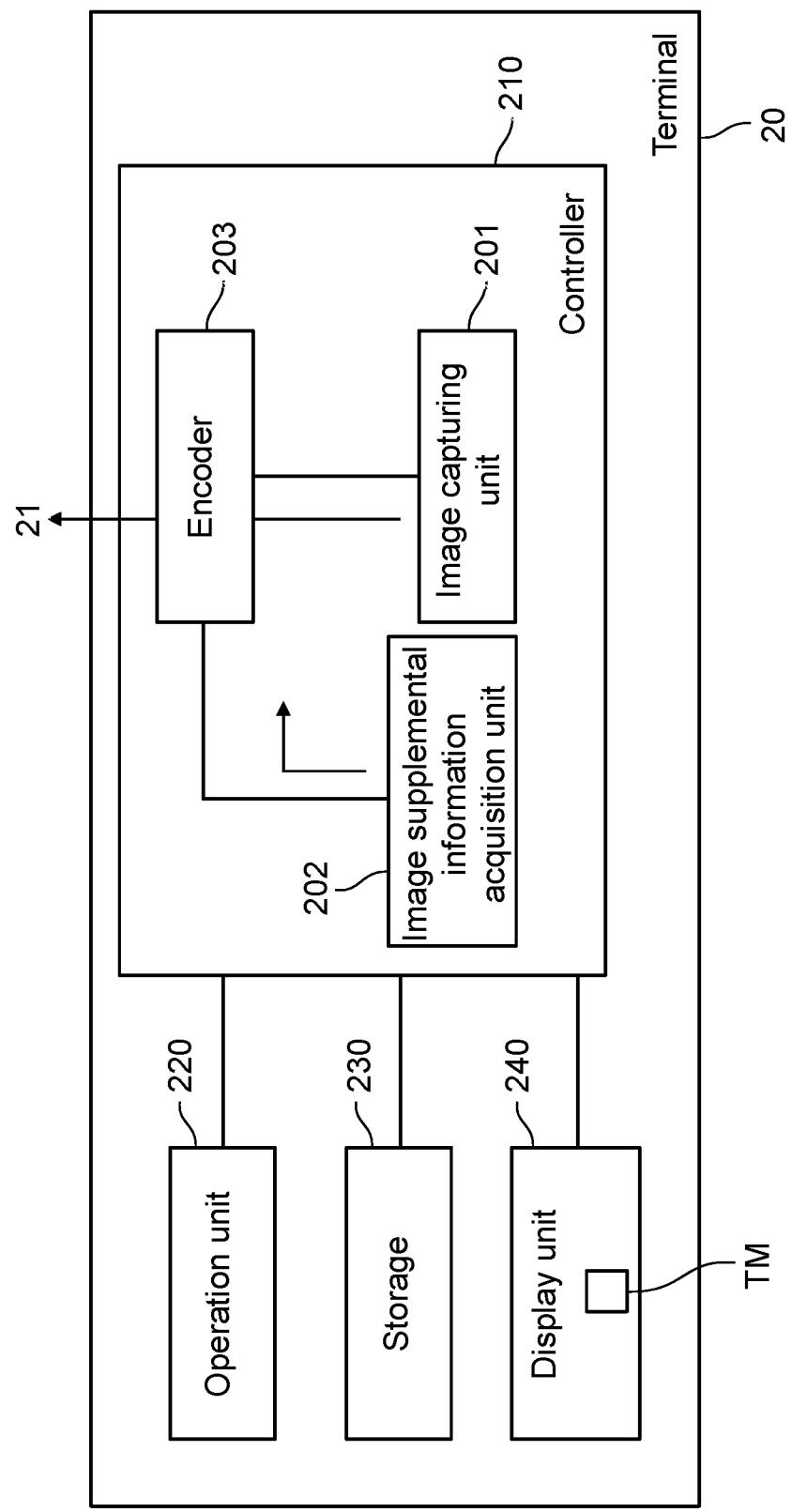
FIG. 2 is a block diagram showing a configuration example of a terminal according to the first exemplary embodiment.

FIG. 2 is a block diagram showing a configuration example of terminal 20. Terminal 20 includes controller 210, operation unit 220, storage 230, and display unit 240.

Controller 210 realizes various functions, for example, by a processor executing a program held in storage 230. The processor may include a micro-processing unit (MPU), a central processing unit (CPU), a digital signal processor (DSP), a graphical processing unit (GPU), and the like. Controller 210 supervises overall operation of terminal 20.

Operation unit 220 may include a touch panel, a pointing device, a keyboard, a microphone, and the like. Operation unit 220 receives various operations from a user of terminal 20.

Storage 230 includes a primary storage device, such as a random access memory (RAM) or a read only memory (ROM). Storage 230 may include a secondary storage device such as a hard disk drive (HDD) or a solid state drive (SSD), and may include a tertiary storage device such as an optical disc or a secure digital (SD) card. Further, storage 230 may be an external device. Storage 230 stores various types of data, information, programs, and the like.

Display unit 240 has, for example, a liquid crystal display or an organic EL display. Display unit 240 has a display screen (terminal screen TM). Display unit 240 displays various types of data and images (for example, window images). On terminal screen TM, images of one or more windows (window images WG) can be displayed. Window images WG can include an image of an active window (active window image AWG).

Controller 210 has image capturing unit 201, image supplemental information acquisition unit 202, and encoder 203.

Image capturing unit 201 captures and obtains an image displayed in at least a partial area of terminal screen TM (for example, window image WG), as a display output image to be transmitted to display device 40 and be displayed. The window to be captured may be an arbitrary window, a window specified by a user via operation unit 220, or an active window. In the present exemplary embodiment, it will be exemplified that the display output image is window image WG (for example, active window image AWG).

Note that the window may be a display area on terminal screen TM assigned to an individual piece of software and broadly includes a dialog window and other windows. Further, the window may include a window displayed on the entire surface of the screen (full-screen display) and a window displayed on a part of the screen. Further, the active window includes, for example, a selected window and a window to be processed. The active window does not have to be a window placed on the foremost side of terminal screen TM.

Image supplemental information acquisition unit 202 acquires image supplemental information about an image captured by image capturing unit 201. The image supplemental information includes at least a reference position of window image WG on terminal screen TM (for example, the reference position is the upper left position of window image WG). The reference position of window image WG may be an image position (display position) that works as a reference of window image WG. The image supplemental information includes an image size (display size) of window image WG on terminal screen TM and a resolution of terminal screen TM. Note that image position information is configured to include the reference position and the image size of window image WG on terminal screen TM. Further, the image supplemental information may include as the other information a type of the application of window image WG, a play state of the application, a role (attribute) of the user of terminal 20, a wireless communication condition such as a reception level or a signal-to-noise ratio (SNR) obtained from wireless device 21, and other information. The type of application may include moving image, still image, and the like. The play state of an application may include play, pause, stop, and the like. The role of user may include roles such as owner, presenter, clerk, and the like of the meeting. The image supplemental information may further include information of an aspect ratio of terminal screen TM. Note that the information of the aspect ratio and the resolution of terminal screen TM may be previously transmitted to display control device 30 separately from the image supplemental information when communication is established with display control device 30.

Encoder 203 encodes obtained window image WG and the obtained image supplemental information about window image WG into a predetermined data format and outputs the encoded result.

Terminal 20 communicates various data via wireless device 21. For example, terminal 20 transmits window image WG and the image supplemental information to display control device 30 via wireless control device 10. Terminal 20 transmits window image WG to display control device 30 via wireless control device 10 at a predetermined frequency (for example, at a frame rate of 20 fps, 5 fps, or 1 fps). The higher the frequency of the transmission of window image WG is, the larger the number of window images WG is transmitted per unit time, and therefore the smoother the video is.

Figure 3:
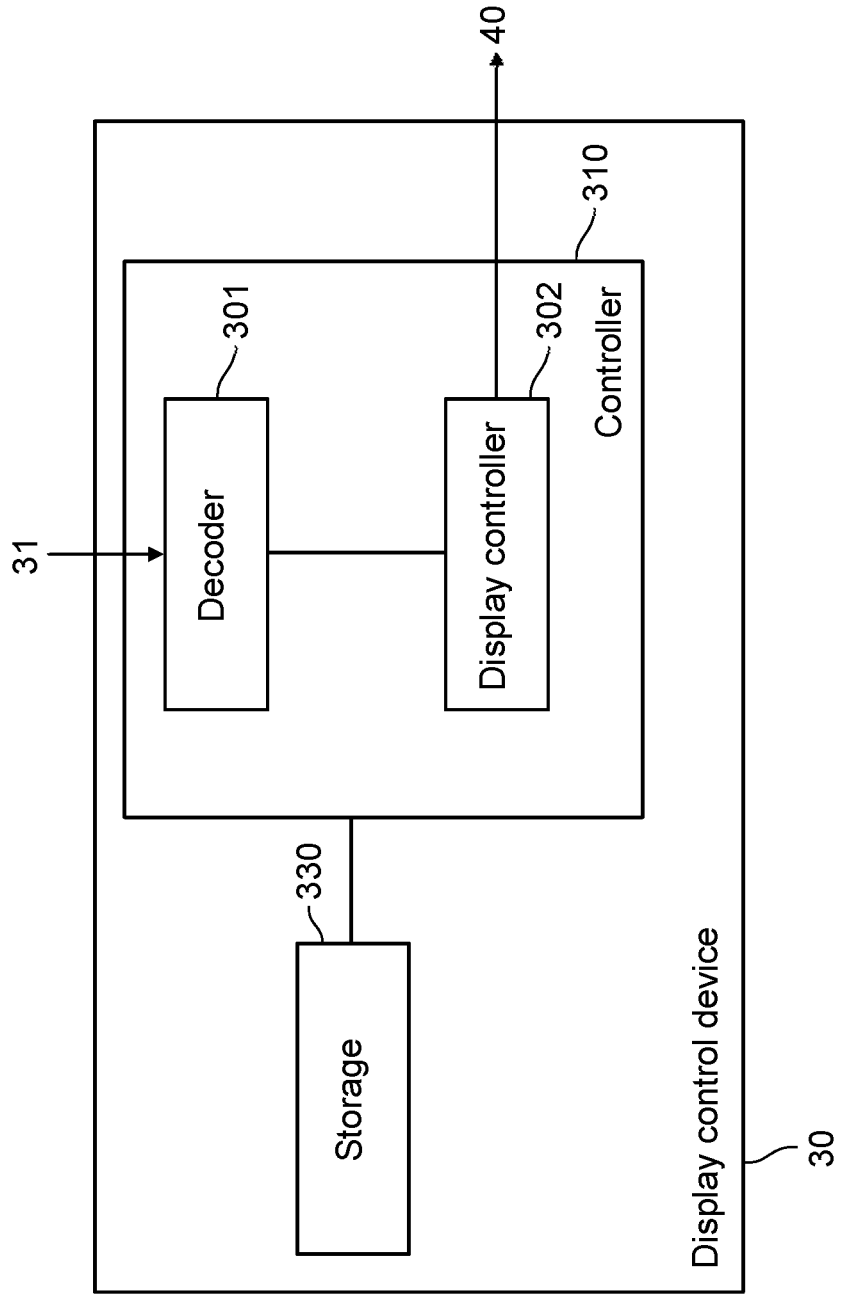
FIG. 3 is a block diagram showing a configuration example of a display control device according to the first exemplary embodiment.

FIG. 3 is a block diagram showing a configuration example of display control device 30. Display control device 30 includes controller 310 and storage 330.

Controller 310 realizes various functions, for example, by a processor executing a program held in storage 330. The processor may include an MPU, a CPU, a DSP, a GPU, and the like. Controller 310 performs overall control of operation of the whole of display control device 30.

Storage 330 includes a primary storage device (for example, a RAM or a ROM). Storage 330 may include a secondary storage device (for example, an HDD or an SSD) and a tertiary storage device (for example, an optical disc or an SD card). Further, storage 330 may be an external device. Storage 330 stores various types of data, information, programs, and the like. Storage 330 may hold, for example, information of an aspect ratio or a resolution of shared screen KM of display device 40.

Controller 310 includes decoder 301 and display controller 302. Decoder 301 decodes window image WG and the image supplemental information that are obtained via wireless device 31 and encoded into a predetermined data format.

On the basis of the image supplemental information from each terminal 20, display controller 302 generates drawing information for displaying window image WG from each terminal 20. For example, display controller 302 generates the drawing information for displaying window image WG from terminal 20A on the basis of the image supplemental information from terminal 20A (see FIG. 4 and the like); and display controller 302 generates the drawing information for displaying window image WG from terminal 20B on the basis of the image supplemental information from terminal 20B. Display controller 302 instructs display device 40 to draw and display each window image WG on shared screen KM according to each piece of generated drawing information.

Display control device 30 further communicates various types of data via wireless device 31. For example, display control device 30 receives window images WG and image supplemental information from the plurality of terminals 20 via wireless control device 10.

Display controller 302 obtains window image WG and the image supplemental information via wireless device 31. Display controller 302 determines, for each of window images WG obtained from terminals 20, the position of each window image WG on shared screen KM on the basis of the image supplemental information. Display controller 302 causes each window image WG to be displayed at each position determined on shared screen KM.

Figure 4:
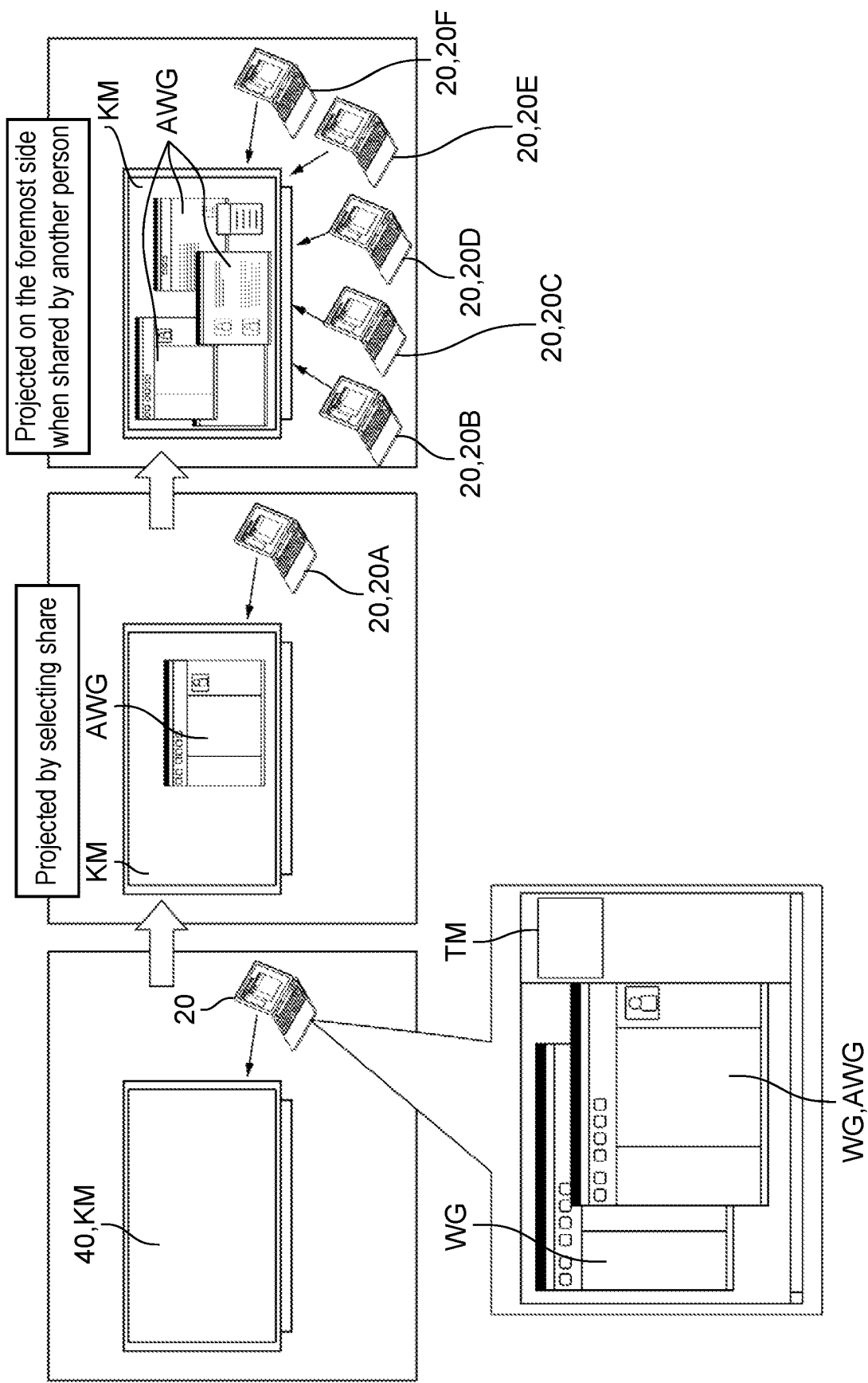
FIG. 4 is a diagram schematically illustrating operation of the image display system according to the first exemplary embodiment.

When a plurality of window images WG are displayed with the display areas of window images WG overlapping each other on shared screen KM, display controller 302 may determine a display order (display layers) along the direction perpendicular to shared screen KM (for example, the direction connecting the closer side and the farther side of shared screen KM with respect to the paper surface of FIG. 4) on the basis of the order of the instruction of start of sharing the plurality of active window images AWG or on the order of reception of window images WG. That is, display controller 302 may determine which image of the plurality of overlapping window images WG to be displayed on the front side and which image to be displayed on the back side.

Controller 310 may further set a display mode on shared screen KM of display device 40. Display mode may include a sharing mode in which a plurality of window images WG from a plurality of terminals 20 are allowed to be displayed on shared screen KM, a single mode in which one or more window images WG from one terminal 20 are allowed to be displayed, and other modes. The single mode may include a full-screen display mode. In the single mode, when window image WG from one terminal 20 is being displayed, window images WG from other terminals 20 are not allowed to be displayed. Controller 310 may change the display mode when an instruction of changing the display mode is received from either of wireless control device 10 or terminal 20 via wireless device 31.

FIG. 4 is a diagram schematically illustrating operation of image display system 5. With reference to FIG. 4, the plurality of terminals 20 include terminals 20A, 20B, . . . .

First, wireless control device 10 detects whether wireless control device 10 and terminal 20 are connected via wireless device 11 and wireless device 21.

When wireless control device 10 detects that wireless control device 10 and terminal 20A are connected to each other, controller 210 of terminal 20A specifies via operation unit 220 (for example, a share button) of terminal 20A whether the screen of active window image AWG displayed on terminal screen TM is shared (screen-sharing) by display device 40. When the screen-sharing is specified, terminal 20A transmits active window image AWG to be screen-shared and the image supplemental information of active window image AWG to display control device 30 via wireless device 21 connected to terminal 20A, wireless device 11, and wireless device 31.

Display controller 302 of display control device 30 causes shared screen KM of display device 40 to project and display active window image AWG transmitted from terminal 20A via wired or wireless connection. At this time, display controller 302 may determine the position and the size of active window image AWG of terminal 20A on shared screen KM on the basis of the position and the size of active window image AWG on terminal screen TM. Therefore, the positional relation of active window image AWG with respect to the screen is maintained between terminal screen TM and shared screen KM. Note that, in the present exemplary embodiment, it will be exemplified that only active window image AWG is screen-shared even when a plurality of windows are open on terminal screen TM of terminal 20A and a plurality of window images WG are displayed Subsequently, when wireless control device 10 detects that terminal 20B other than terminal 20A is connected to wireless control device 10, controller 210 of terminal 20B specifies via operation unit 220 (for example, a share button) of terminal 20B whether active window image AWG displayed on terminal screen TM is screen-shared by display device 40. When the screen-sharing is specified, terminal 20B transmits active window image AWG to be screen-shared and the image supplemental information of active window image AWG to display control device 30 via wireless device 21 connected to terminal 20B, wireless device 11, and wireless device 31.

Display controller 302 of display control device 30 causes shared screen KM of display device 40 to project and display also active window image AWG transmitted from terminal 20B via wired or wireless connection. Also, when screen-sharing is assigned to other terminals (for example, terminals 20C, 20D, 20E, 20F), active window images AWG from terminals 20 are screen-shared on display device 40 in the same manner. Thus, the screens of the plurality of terminals 20 operated by a plurality of people are shared.

Note that the screen-sharing of a plurality of terminals 20 may be started at different timings. Active window image AWG transmitted from terminal 20 that started screen-sharing at a later timing than the other terminals 20 is projected and displayed on the foremost side of the shared screen of display device 40. Note that the positions of active window images AWG from terminals 20 on shared screen KM correspond to the positions of the images of the active windows on terminal screens TM of such terminals 20.

Note that when an operation about the active window image (for example, movement, change of size, or switching of active windows) is performed on operation unit 220 of each terminal 20, operation unit 220 transmits operation information of the operation to display control device 30 via wireless devices 21, 11. When display controller 302 of display control device 30 receives the operation information, display controller 302 may perform movement, change of size, switching, and the like of the corresponding active window image displayed on shared screen KM on the basis of the operation information. Therefore, in image display system 5, an operation by operation unit 220 of each terminal 20 can be reflected to the active window image displayed on shared screen KM.

Figure 5:
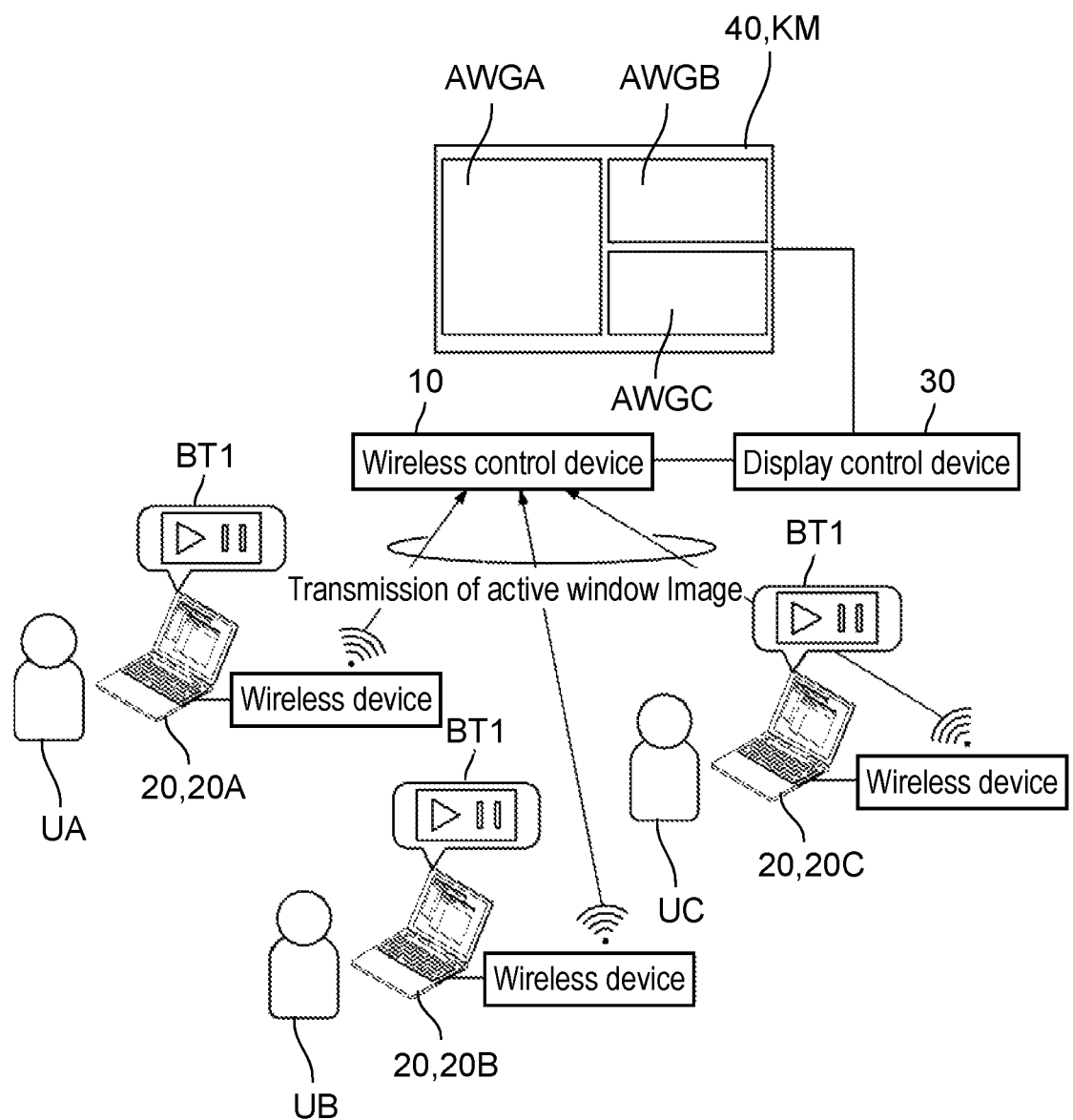
FIG. 5 is a diagram for describing a first example of screen-sharing.

Next, a description will be given on a first example of screen-sharing by image display system 5. FIG. 5 is a diagram for describing the first example of screen-sharing by image display system 5. In the first example of screen-sharing, it will be exemplified that a plurality of terminals 20A, 20B, 20C transmit active window images AWG to display control device 30 to simultaneously display active window images AWG on display device 40. The user of terminal 20A is user UA, the user of terminal 20B is user UB, and the user of terminal 20C is user UC.

With reference to FIG. 5, the plurality of terminals 20 (20A, 20B, 20C) each display one or more window images WG on terminal screen TM. In each terminal 20, one of window images WG is active window image AWG.

When connected to a communication area of wireless device 11 (for example, a WiGig communication area), each terminal 20 receives, for example, a notification whether each terminal 20 performs screen-sharing, and terminal 20 displays this notification. When controller 210 of terminal 20 detects that share button BT1 serving as operation unit 220 is pressed down, controller 210 transmits active window image AWG and the image supplemental information about active window image AWG to display control device 30 via wireless device 21 and wireless device 11.

Display control device 30 receives from terminals 20 respective active window images and respective pieces of image supplemental information via wireless device 31. Display controller 302 causes, for each terminal 20, active window image AWG of terminal 20 to be displayed on shared screen KM of display device 40 on the basis of the image supplemental information of terminal 20. In this case, active window image AWG of each terminal 20 is displayed on shared screen KM of display device 40 at the position, of active window image AWG of each terminal 20, on terminal screen TM of each terminal 20, and the positional relation of active window image AWG with respect to the screen is therefore maintained.

Further, when a plurality of active window images AWG of terminals 20 are simultaneously displayed on shared screen KM, the display positions (image positions) of a plurality of active window images AWG can overlap each other. In this case, display controller 302 may cause to display, on the front side of shared screen KM, active window image AWG whose timing of starting sharing is later, in other words, active window image AWG whose time of reception by display control device 30 is later.

When the resolution or the aspect ratio is not the same between terminal screen TM and shared screen KM, display controller 302 may appropriately adjust the display position or the display size of active window image AWG on shared screen KM.

Figure 6:
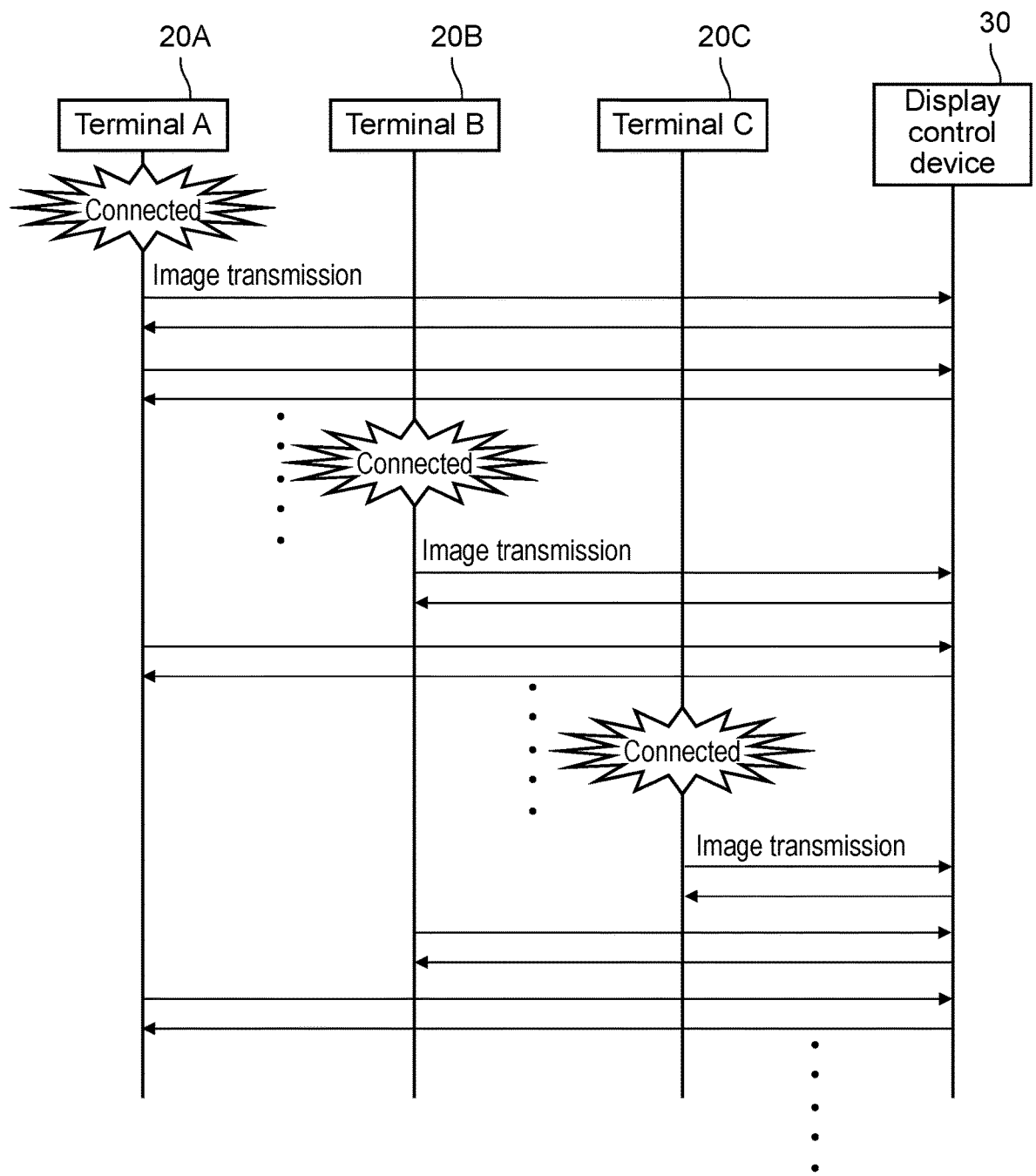
FIG. 6 is a sequence diagram related to the first example of screen-sharing.

FIG. 6 is a sequence diagram related to the first example of screen-sharing.

On each terminal 20 (20A, 20B, 20C, . . . ), terminal screen TM displays one or more window images WG. Image capturing unit 201 of each terminal 20 is communicably connected (by WiGig wireless connection, for example) to display control device 30, and when image capturing unit 201 detects start of sharing, image capturing unit 201 captures and obtains active window image AWG displayed on terminal screen TM. The start of sharing may be detected based on, for example, pressing down of share button BT1. When terminal 20 and display control device 30 are communicably connected to each other, a client application of terminal 20 and a server application of display control device 30 may be linked to each other.

Image supplemental information acquisition unit 202 acquires the image position information (terminal image position information) including the display position (terminal display position) and the display size (display size of terminal) of active window image AWG on terminal screen TM. Terminals 20 transmit active window images AWG (AWGA, AWGB, AWGC, . . . ) to display control device 30 via wireless device 21 at a predetermined frequency. Note that the terminal display position may be a central position of active window image AWG on terminal screen TM or other reference positions.

With reference to FIG. 6, terminals 20A, 20B, 20C are communicably connected to display control device 30, and sharing is started. Then, terminals 20A, 20B, 20C each start to transmit active window image AWG in that order. Further, each of terminals 20A, 20B, 20C transmits image supplemental information to display control device 30 via wireless device 21 at at least one of the following timings: when communicably connected to display control device 30; when starting sharing; and when changing active window image AWG on terminal screen TM (TMA, TMB, TMC) of each terminal 20. The changing of active window image AWG may include movement of an active window, change of size of an active window, switching active windows, and the like. The change of active window image AWG may be automatically performed or manually performed (by a user operation via operation unit 220). Further, each terminal 20 may transmit the image supplemental information to display control device 30 via wireless device 21 together with active window image AWG every time each terminal 20 sends active window image AWG.

Display control device 30 receives active window image AWG from each terminal 20 via wireless device 31 at a predetermined frequency. Every time when receiving active window image AWG or every time when receiving image supplemental information, display controller 302 may determine the position of active window image AWG on shared screen KM of display device 40 on the basis of the image supplemental information. For example, display controller 302 may determine (for example, calculate) the image position information (terminal image position information) including the display position (shared display position) and the display size (shared display size) of active window image AWG on shared screen KM on the basis of the image position information included in the image supplemental information. Display controller 302 causes active window image AWG to be displayed at the determined position of each active window image AWG. Note that shared display position may be the central position of active window image AWG on shared screen KM or may be another reference position.

Next, with reference to FIGS. 7 to 10, a display example in the first example of screen-sharing will be described. FIGS. 7, 8, 9, and 10 are in time series, and a display process proceeds in that order. In this description, window images are represented by AX, BX, and CX, where X is a positive integer.

Figure 7:
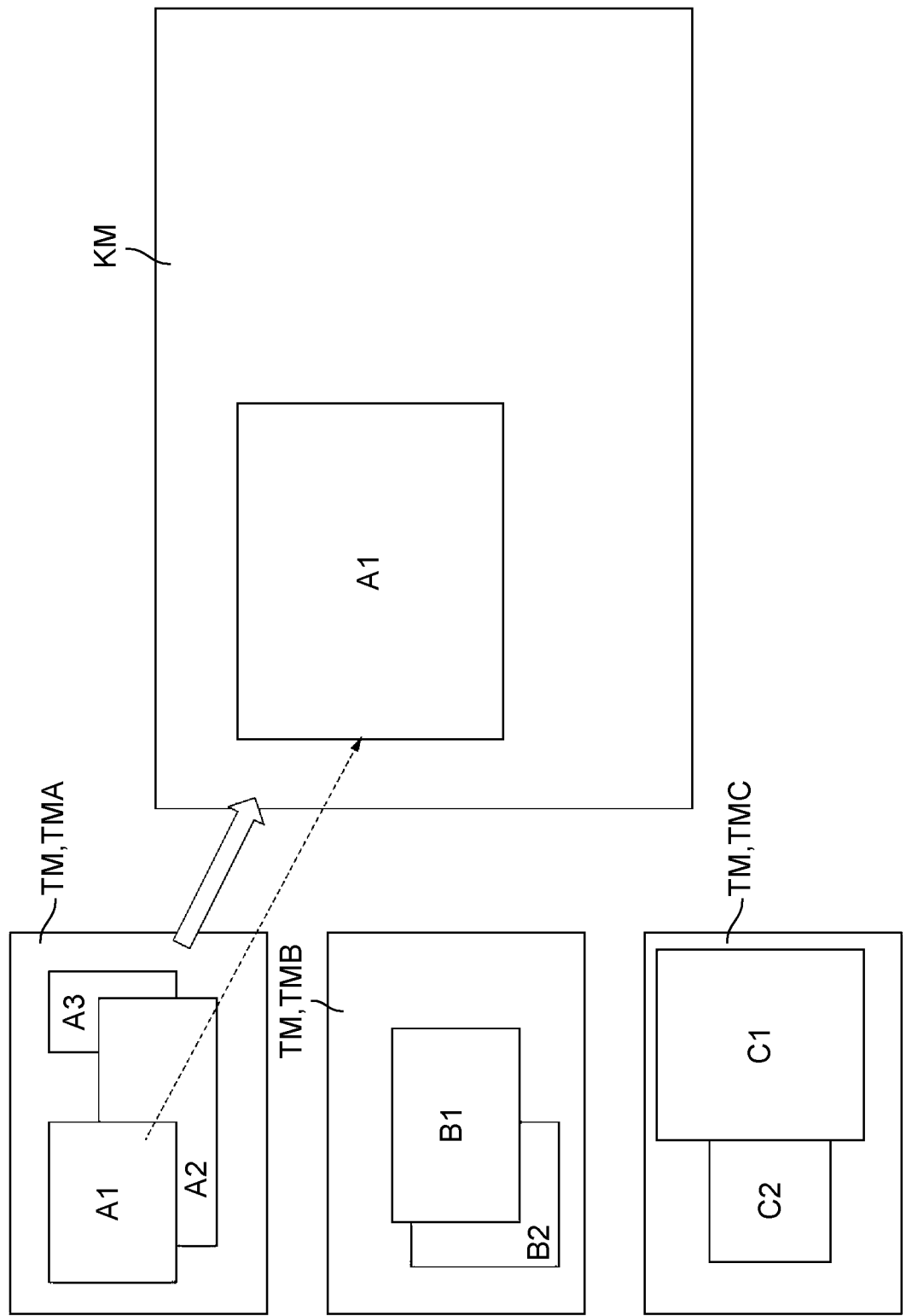
FIG. 7 is a diagram showing a display example in the first example of screen-sharing.
Figure 8:
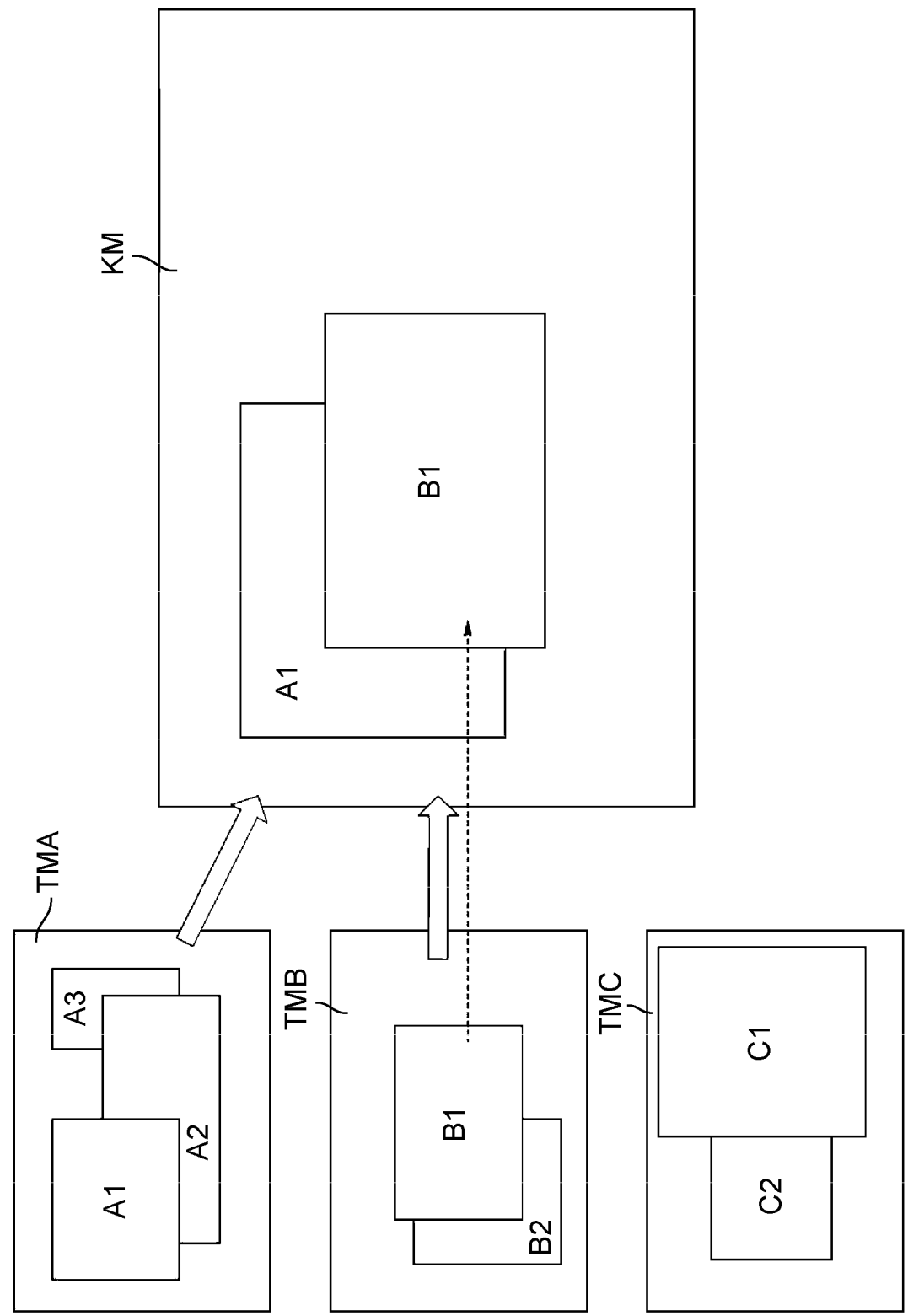
FIG. 8 is a diagram (continuation of FIG. 7) showing a display example in the first example of screen-sharing.
Figure 9:
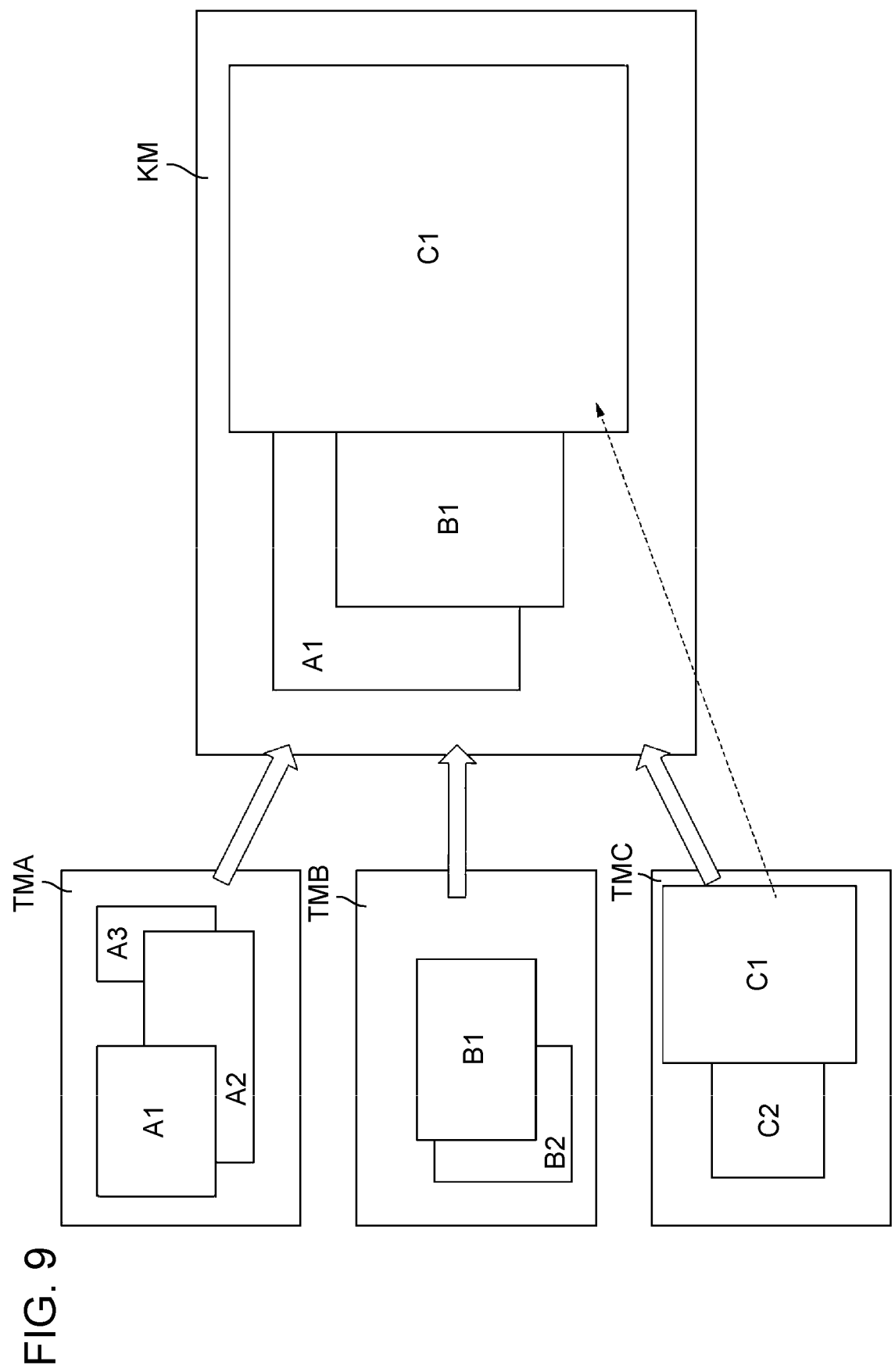
FIG. 9 is a diagram (continuation of FIG. 8) showing a display example in the first example of screen-sharing.

FIGS. 7 to 9 show terminal screen TMA of terminal 20A, terminal screen TMB of terminal 20B, and terminal screen TMC of terminal 20C. On terminal screen TMA, window image A1 is active window image AWGA and displayed on the foremost side, window image A2 is disposed on the back side of window image A1, and window image A3 is displayed on the back side of window image A2. On terminal screen TMB, window image B1 is active window image AWGB and displayed on the foremost side, and window image B2 is disposed on the back side of window image B1. On terminal screen TMC, window image C1 is active window image AWGC and displayed on the foremost side, and window image C2 is disposed on the back side of window image C1.

With reference to FIG. 7, terminal 20A is instructed to start sharing, and window image A1, which is active window image AWGA of terminal 20A, is displayed at the display position (position), determined on the basis of the image supplemental information, on shared screen KM of display device 40. In FIG. 7, the resolution and the aspect ratio are the same between terminal screen TM and shared screen KM; therefore, the relative position and the relative size of window image A1 with respect to terminal screen TMA is the same as the relative position and the relative size of window image A1 with respect to shared screen KM.

With reference to FIG. 8, next to terminal 20A, terminal 20B is instructed to start sharing, and window image B1, which is active window image AWGB of terminal 20B, is displayed at the display position, determined on the basis of the image supplemental information, on shared screen KM of display device 40. The display area where active window image AWG is displayed on shared screen KM is determined depending on the shared display position and the shared display size. When the display areas of a plurality of active window images AWG from a plurality of terminals 20 overlap each other on shared screen KM, display controller 302 determines on which of the front side (near side of the paper surface) or the back side (far side of the paper surface) active window images AWGA and AWGB are respectively displayed, on the basis of the timings when terminals 20A, 20B are instructed to start sharing, in other words, on the basis of the reception timings when active window images AWGA and AWGB are received. With reference to FIG. 8, since the timing when terminal 20B is instructed to start sharing is later than the timing when terminal 20A is instructed to start sharing, window image B1 is displayed on the front side of window image A1.

In FIG. 8, the resolution and the aspect ratio are the same between terminal screen TM and shared screen KM; therefore, the relative position and the relative size of window image B1 with respect to terminal screen TMB is the same as the relative position and the relative size of window image B1 with respect to shared screen KM. That is, both on terminal 20 and on display device 40, the positional relation of active window image AWG with respect to the screen is maintained.

With reference to FIG. 9, next to terminal 20B, terminal 20C is instructed to start sharing, and window image C1, which is active window image AWGC of terminal 20C, is displayed at the display position, determined on the basis of the image supplemental information, on shared screen KM of display device 40. Further, in FIG. 9, start of sharing is instructed in the order of terminals 20A, 20B, 20C; therefore, window image C1 from terminal 20C is displayed on the foremost side, window image B1 from terminal 20B is displayed next to the foremost side, and window image A1 from terminal 20A is displayed on the rearmost side.

In FIG. 9, the resolution and the aspect ratio are the same between terminal screen TM and shared screen KM; therefore, the relative position and the relative size of window image C1 with respect to terminal screen TMC is the same as the relative position and the relative size of window image C1 with respect to shared screen KM. That is, both on terminal 20 and on display device 40, the positional relation of active window image AWG with respect to the screen is maintained.

Figure 10:
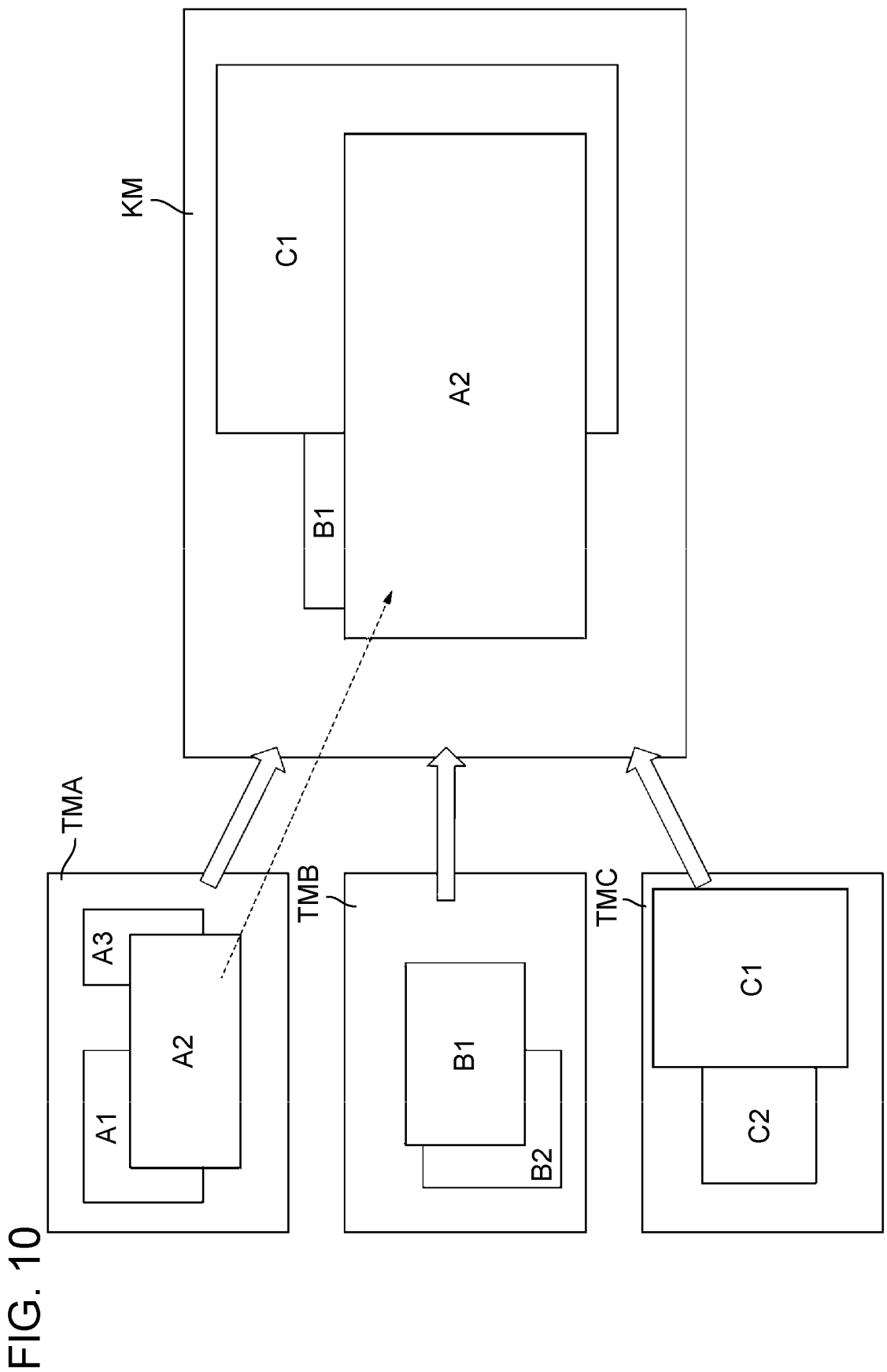
FIG. 10 is a diagram (continuation of FIG. 9) showing a display example in the first example of screen-sharing.

In FIG. 10, on terminal 20A, a user operation is performed via operation unit 220. Specifically, terminal 20A specifies window image A2 as active window image AWGB via operation unit 220. Terminal 20A transmits window image A2 to display control device 30 via wireless device 21 and stops sending window image A1. Therefore, active window image AWGA from terminal 20A displayed on shared screen KM is changed from window image A1 to window image A2.

When the display areas of a plurality of active window images AWG from a plurality of terminals 20 overlap each other on shared screen KM, display controller 302 determines a display order in which active window images AWGA, AWGB, AWGC are displayed along the direction perpendicular to shared screen KM, on the basis of the timings when terminals 20A, 20B, 20C are instructed to start sharing and on the basis of the timing of the instruction to change active window image AWG In FIG. 10, the timing when terminal 20A is instructed to change active window image AWGA is later than the timing when terminal 20C is instructed to start sharing. Accordingly, window image A2 from terminal 20A, window image C1 from terminal 20C, and window image B1 from terminal 20B are disposed and displayed in that order from the front side of shared screen KM. Note that the above display order may be determined on the basis of the timing of instruction to change active window image AWG without taking into account the timings of the instructions to start sharing.

As described above, in FIG. 7, image display system 5 transmits first window image A1 of terminal 20A and displays window image A1 on shared screen KM. Subsequently, in FIG. 8, image display system 5 transmits window image B1 of terminal 20B to additionally display window image B1 on shared screen KM. Subsequently, in FIG. 9, image display system 5 transmits window image C1 of terminal 20C to additionally display window image C1 on shared screen KM. Subsequently, in FIG. 10, image display system 5 switches active window image AWGA from window image A1 to window image A2 on terminal 20A, and transmits window image A2 to display window image A2 on shared screen KM.

Next, a description will be given on an example of adjustment of the display position of a window image in a case where the aspect ratio and the resolution of the screen are different between terminal 20 and display device 40.

Figure 11:
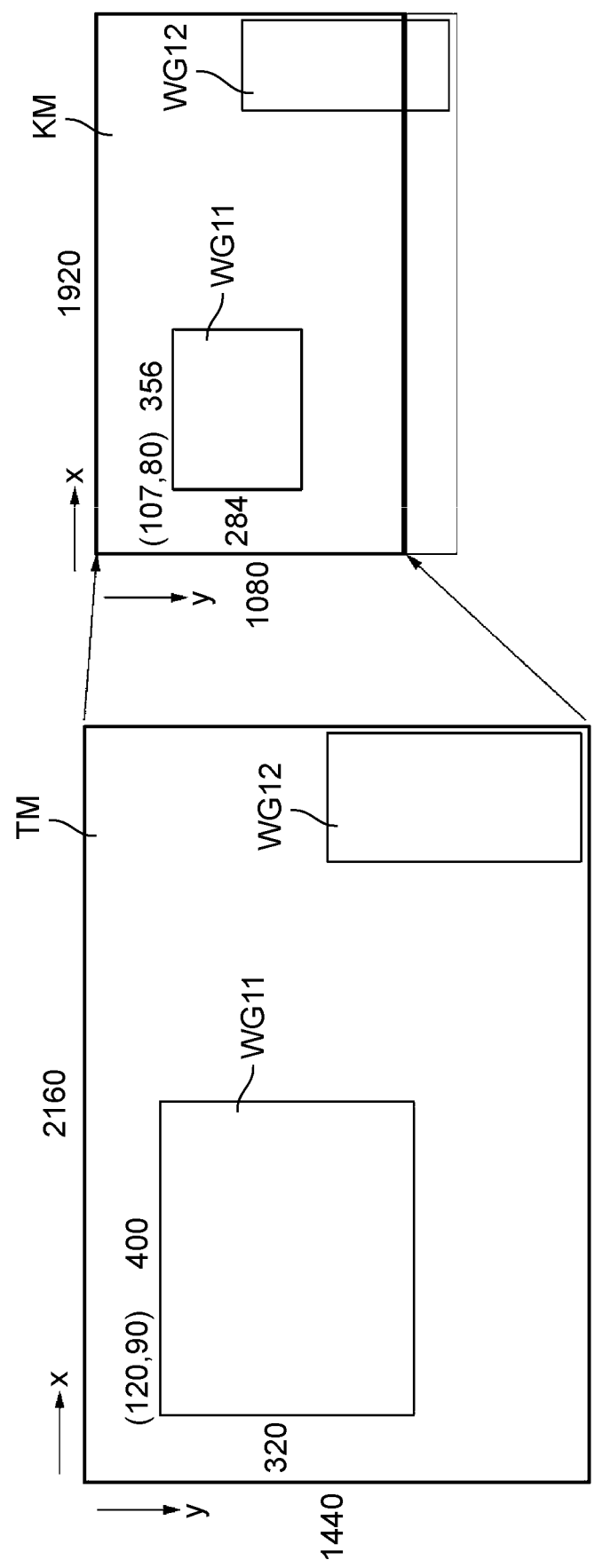
FIG. 11 is a diagram showing an example of adjustment of display positions, on a shared screen, of window images from the terminals.
Figure 12:
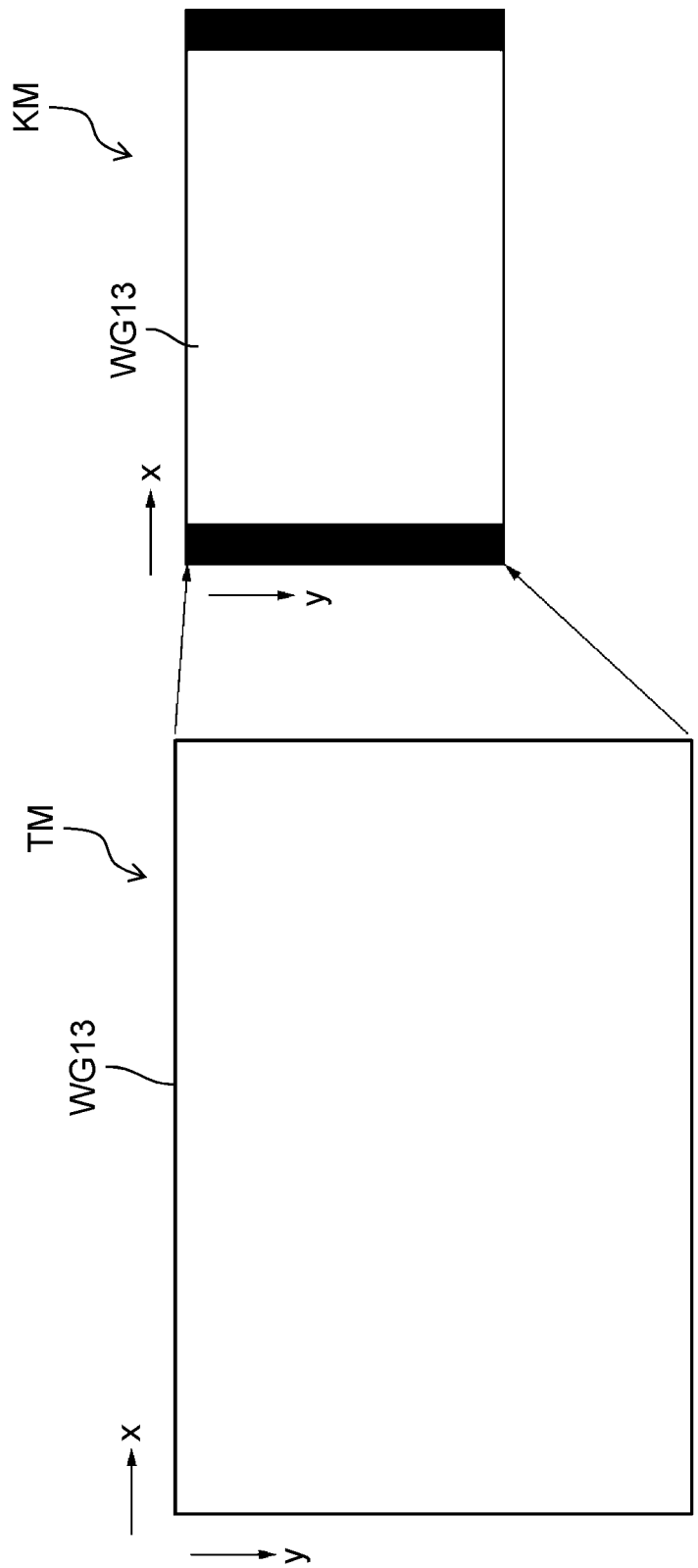
FIG. 12 is a diagram showing an example of adjustment of a display position, on the shared screen, of a window image in the case of full-screen display.

FIGS. 11 and 12 are diagrams each showing an example of adjustment of display positions, on shared screen KM, of window images WG from terminals 20. In FIG. 11, display controller 302 adjusts the display positions of window images WG on the basis of the relative positions of window images WG with respect to the screen. Window images WG include active window images AWG. FIG. 12 shows an example where full-screen display is performed on terminal screen TM. Note that, in FIGS. 11 and 12, the position on the screen may also be denoted as (x1, y1), taking into account position x1 in the x direction and position y1 in the y direction. Note that the position (0, 0) is located on the left upper end of each screen in FIGS. 11 and 12.

Display controller 302 obtains information of at least one of the aspect ratio and the resolution of terminal screen TM of each terminal 20 via wireless device 31. Display controller 302 obtains the information of at least one of the aspect ratio and the resolution of shared screen KM from, for example, storage 330. Display controller 302 obtains image supplemental information via wireless device 31 and then obtains image position information included in the image supplemental information. The image position information may include, for example, the reference position or the image size of window image WG (WG11, WG12, . . . ).

In FIG. 11, the resolution of terminal screen TM is 2160 (x direction)×1440 (y direction). The aspect ratio of terminal screen TM is 3:2. Further, the resolution of shared screen KM is 1920 (x direction)×1080 (y direction). The aspect ratio of shared screen KM is 16:9. Therefore, shared screen KM is horizontally longer than terminal screen TM.

On terminal screen TM, the position (120, 90) is the reference position of window image WG11. Window image WG11 is located in the area extending +400 in the x direction from the reference position (120, 90) and +320 in the y direction from the reference position (120, 90). In this case, the relative position of the reference position of window image WG11 with respect to terminal screen TM is 120/2160≈0.056 in the x direction and is 90×(1920/2160)/1080≈0.073 in the y direction.

Even when the resolution or the aspect ratio is different between terminal screen TM and shared screen KM, it is desirable that the aspect ratios (the radio between horizontal length and vertical length) window images WG11, WG12 be not changed. That is because effects of objects drawn in window images WG11, WG12 would change. Therefore, when the resolution or the aspect ratio is different between terminal screen TM and shared screen KM, it is desirable that the display areas of window images WG11, WG12 be adjusted with reference to, for example, the length of shared screen KM in the width direction (x direction).

When the length in the y direction with respect to the length in the x direction (in other words, relative length) on shared screen KM is shorter than the length in the y direction with respect to the length in the x direction (in other words, relative length) on terminal screen TM, an end part (for example, the lower end part) of window image WG12 capable of being displayed within the screen of terminal screen TM can be out of shared screen KM. However, an effect of an end part of window image WG12 in the y direction being out of shared screen KM is smaller than an effect of an end part of window image WG12 being out of shared screen KM in the x direction. On the lower end part of terminal screen TM there are displayed icons of applications being executed and the like, and the lower end part of window image WG12 is often behind the icons or is not displayed. Therefore, even when the lower end part of window image WG12 is excluded from being displayed, it gives a relatively smaller feeling of strangeness about the fact that the lower part is not displayed than when, for example, the left end part or the right end part (end part in the x direction) of window image WG12 is excluded from being displayed. Further, scrolling on shared screen KM in the y direction makes visible the part of window image WG12 that is excluded from being displayed. Note that, for example, any one of terminals 20 may be given control authority for scrolling so that scrolling on shared screen KM can be performed by terminal 20 that is given the authority.

The ratio between lengths in the width direction (x direction), one length on terminal screen TM and the other length on shared screen KM, is 1920/2160≈0.89. Therefore, to equalize the aspect ratio between window images WG11, WG12, display controller 302 reduces the sizes of window images WG11, WG12 on shared screen KM down to 89% of the sizes of window images WG11, WG12 on terminal screen TM, using the same ratio for both of the x direction and the y direction. As a result, the length of window image WG11 in the x direction becomes 400×0.89=356, and the length in the y direction becomes 320×0.89=284, for example.

On the basis of the above relative position and the relative size, display controller 302 of display control device 30 adjusts the display position (shared display position) and the display size (shared display size) of window image WG11 to be displayed on shared screen KM. Specifically, the position in the x direction on shared screen KM of the reference position as the display position of window image WG11 is calculated as 120×(1920/2160)≈107, taking into account the relative position of the above relative position in the x direction. The position of the reference position in the y direction of window image WG11 is calculated as 90×(1920/2160)≈80, taking into account the above relative position in the y direction. As a result, the reference position of window image WG11 is (107, 80).

As described above, image display system 5 can display a window image on shared screen KM in the same relative size and at the same relative position as the relative size and the relative position, of window image WG displayed on terminal screen TM of terminal 20, with respect to terminal screen TM.

Note that the relative size and the relative position with respect to terminal screen TM may be calculated on display control device 30.

Figure 13:
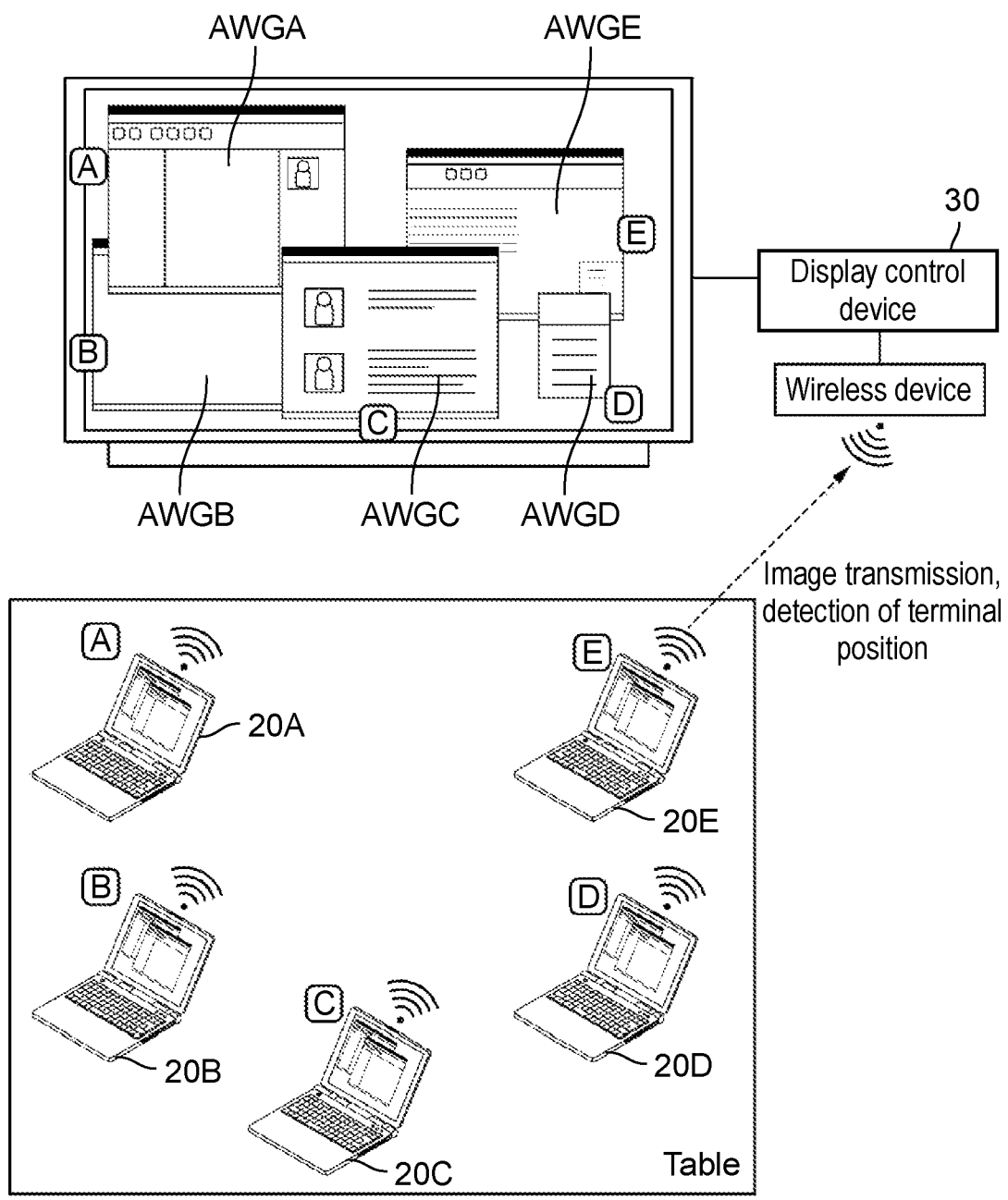
FIG. 13 is a diagram for describing a second example of screen-sharing.

FIG. 12 shows that one window image WG13 is full-screen displayed on terminal 20. In this case, the relative length in the y direction with respect to the x direction on terminal screen TM is longer than the relative length in the y direction with respect to the x direction on shared screen KM. Therefore, when the display position and the size of window image WG13 are adjusted with reference to the length in the x direction on shared screen KM without the aspect ratio of window image WG13 being changed, window image WG13 is not full-screen displayed on shared screen KM, and on the end parts in the x direction (on the end parts in the horizontal direction) there are generated empty areas where no window image WG13 is displayed. To address this issue, display controller 302 explicitly shows the areas on shared screen KM where window image WG13 having been adjusted is not displayed. These areas may be explicitly shown being filled with black color, for example. In this case, display device 40 can display, emphasizing the fact that full-screen display is performed also on shared screen KM. Note that, depending on the aspect ratio of the screen, there may be generated an empty area on an end part in the y direction where no window image WG13 is displayed. Also in this case, the area where window image WG13 having been adjusted is not displayed may be explicitly shown on shared screen KM Next, a description will be given on a second example of screen-sharing by image display system 5. FIG. 13 is a diagram for describing the second example of screen-sharing by image display system 5. In the second example of screen-sharing, image display system 5 detects positions of a plurality of terminals 20A, 20B, 20C and lays out and displays the plurality of active window images AWG, depending on the positions of terminals 20. Note that, with reference to FIG. 13, the components similar to the components of image display system 5 shown in FIGS. 1 and 5 will not be described or will be briefly described.

In FIG. 13, a plurality of terminals 20 (20A, 20B, 20C, 20D, 20E) are placed on a table. In this case, the table coincides with a communication area of wireless device 11. Wireless control device 10 transmits via wireless device 11 a search signal for searching for wireless device 21 connected to terminal 20 while beamforming the searching signal in a predetermined direction in the communication area. Wireless control device 10 transmits the search signal while sequentially changing the direction of the beamforming such that the search signal covers the area of the table as the communication area.

When wireless control device 10 receives a response responding to the search signal from wireless device 21 through wireless device 11, wireless control device 10 determines that terminal 20 is located on the direction of the response. Note that the response from wireless device 21 may include identification information of terminal 20 having transmitted the response and identification information of the user of terminal 20. As a result of searching for terminals 20, wireless control device 10 detects positions of the plurality of terminals 20 (20A, 20B, 20C, 20D, 20E) located on the table as the communication area and the positions of the users (for example, sitting positions). Wireless control device 10 transmits the detected positions of terminals 20 to display control device 30 via wireless device 11.

Display control device 30 obtains information of the detected positions of terminals 20 via wireless device 31. Display controller 302 causes shared screen KM to display active window images AWG from terminals 20, on the basis of the detected positions of the plurality of terminals 20. Note that display control device 30 may search for terminals 20 and detect the positions of terminals 20 via wireless device 31.

For example, since terminal 20A is disposed on the upper left part on the table in FIG. 13, active window image AWGA from terminal 20A is displayed on the upper left part of shared screen KM. Since terminal 20B is disposed on the lower left part on the table, active window image AWGB from terminal 20B is displayed on the lower left part of shared screen KM. Since terminal 20C is disposed on the lower central part on the table, active window image AWGC from terminal 20C is displayed on the lower central part of shared screen KM. Since terminal 20D is disposed on the lower right part on the table, active window image AWGD from terminal 20D is displayed on the lower right part of shared screen KM. Since terminal 20E is disposed on the upper right part on the table, active window image AWGE from terminal 20E is displayed on the upper right part of shared screen KM.

By this display, the positional relation between the positions of terminals 20 on the table and the positional relation between the sitting positions of the users in the real space correspond to the positional relation between active window images AWG on shared screen KM; therefore, it is easy to intuitively recognize which of active window images AWG displayed on shared screen KM is from which terminal 20. Further, when the positions of terminals 20 are put in correspondence to the sitting positions of the users of terminals 20, for example, in such a manner that terminals 20 are disposed in the vicinities of the sitting positions of the users of terminals 20, display control device 30 can perform screen-sharing according to the sitting positions of the users of terminals 20.

Note that display controller 302 may insert identification information of the user using each terminal 20 (for example, user name, user ID, photo or illustration of the user) in an arbitrary area (for example, at the upper part) in active window image AWG. On shared screen KM, there may be displayed active window image AWG where user's identification information is shown. By this display, it is possible to recognize from which user's terminal 20 each of displayed active window images AWG is transmitted. Note that terminal 20 may transmit the identification information of the user of terminal 20 to display control device 30 together with the image supplemental information. Alternatively, the identification information may be previously transmitted to display control device 30 and be held in storage 330 of display control device 30.

As described above, in image display system 5, when terminal 20 is just brought close to wireless device 11, terminal 20 is connected to wireless device 11, and an image is displayed on shared screen KM by display device 40. Further, image display system 5 can cut out only an active window of each terminal 20 to perform screen-sharing with a plurality of terminals 20. Further, when screen-sharing is used in a meeting, image display system 5 makes it possible to efficiently share displayed contents on terminal screens TM of terminals 20 of a plurality of users attending the meeting. For example, with image display system 5, while materials of the presenter is presented on active window image AWGA of terminal 20A and meeting minutes of the clerk is presented on active window image AWGB of terminal 20B, the materials of the presenter and the meeting minutes of the clerk can be simultaneously displayed on shared screen KM. Further, image display system 5 enables a meeting to be held not in such a manner that one screen of any one of the users attending the meeting is viewed but in such a manner that respective screens of a plurality of users attending the meeting are viewed by screen-sharing using shared screen KM.

In the present exemplary embodiment, it has been exemplified that terminal 20 and display control device 30 communicate with each other via wireless control device 10; however, terminal 20 and display control device 30 may communicate without intervention of wireless control device 10. For example, each terminal 20 and display control device 30 may establish a direct wired or wireless communication path to communicate.

In the present exemplary embodiment, it has been exemplified that wireless control device 10 detects the positions of terminals 20 and the users of terminals 20 by beamforming using wireless device 11, but the present disclosure is not limited to this example. For example, wireless control device 10 may include a radio radar. The radio radar may transmit and receive radio waves (for example, millimeter waves). The controller of wireless control device 10 may detect the position of an object (for example, terminal 20 or a user) on the basis of the transmission and reception of radio waves by the radio radar. Further, the radio radar may be provided instead of wireless device 11 or may be provided together with wireless device 11. When the radio radar and wireless device 11 are both provided, the radio radar may be used to detect a person, and wireless device 11 may be used to detect the position of terminal 20. For example, when the detected person and terminal 20 are positioned within a predetermined range, the controller of wireless control device 10 may determine that the user of terminal 20 is in the vicinity of terminal 20.

In the present exemplary embodiment, it has been exemplified that start of sharing is instructed by pressing down of share button BT1 or other actions, but the instruction of start of sharing may be omitted. In this case, when terminal 20 and display control device 30 are communicably connected, terminal 20 may immediately transmit active window image AWG of terminal 20 to display control device 30, and display control device 30 may display active window image AWG on shared screen KM.

Note that, when searching for terminal 20, the controller of wireless control device 10 may identify terminal 20 located in the vicinity of display device 40. In this case, the controller of wireless control device 10 may calculate a distance between terminal 20 and display device 40, depending on the position of terminal 20 and the position of display device 40 in the communication area obtained by beamforming of the search signal. When the distance is smaller than or equal to a threshold value th1, the controller of wireless control device 10 may determine that terminal 20 is in the vicinity of display device 40. When terminal 20 is determined to be in the vicinity of display control device 30, the controller of wireless control device 10 may transmit the instruction to start sharing to terminal 20 via wireless device 11. When receiving the instruction to start sharing from wireless control device 10 via wireless device 21, terminal 20 may transmit active window image AWG to display control device 30. By the above operation, the screen-sharing using shared screen KM is automatically started depending on the positional relation between terminal 20 and display device 40 without the user instructing to start sharing. Further, wireless control device 10 may notify terminal 20 or display control device 30 of the position information of terminal 20 or display control device 30 that wireless control device 10 has obtained. When terminal 20 is notified of the position information of terminal 20, terminal 20 may instruct to start screen-sharing (for example, instruct to press down share button BT1). When display control device 30 is notified of the position information of display control device 30, display control device 30 may determine whether to start screen-sharing.

In the present exemplary embodiment, it has been exemplified that the display order (display layers) in the direction perpendicular to shared screen KM is determined according to the order of start of sharing, but the present disclosure is not limited to this example. For example, the display layer may be determined depending on the state of the application related to active window image AWG. For example, the play state of the application indicates that pause is released, display controller 302 may suppose that the application should be checked in priority, and may set the display layer for active window image AWG at the front side of other active window images (for example, set at the foremost side) on shared screen KM.

In the present exemplary embodiment, it has been exemplified that active window image AWG is transmitted to display control device 30 from terminal 20 and is then displayed on shared screen KM. However, active window image AWG and other window images (for example, a window image that is second in priority next to the active window image) may be transmitted from one terminal 20, and a plurality of window images of one terminal 20 may be displayed on shared screen KM.

As described above, image display system 5 of the present exemplary embodiment includes: a plurality of terminals 20 each including terminal screen TM (an example of a first screen); and display control device 30 that controls display device 40 including a shared screen (an example of a second screen). Terminal 20 may transmit to display control device 30 active window image AWG (an example of an image on an active window) on terminal screen TM and image supplemental information including image position information indicating a position of active window image AWG on terminal screen TM. Display control device 30 may receive active window image AWG and image supplemental information from each of a plurality of terminals 20. Display control device 30 may determine, for each active window image AWG, a position of active window image AWG on shared screen KM on the basis of the image supplemental information corresponding to active window image AWG. Display control device 30 may cause the plurality of active window images AWG to be displayed at a plurality of positions determined on shared screen KM.

With the above arrangement, image display system 5 can cause active window images AWG from terminals 20 to be displayed on shared screen KM, so that it is possible to share the information of the images displayed on terminal screens TM of a plurality of users using image display system 5. Therefore, with image display system 5, it is not necessary to switch between the window images from a plurality of terminals 20 to display the window images, so that cumbersomeness of user operation can be reduced. Further, each user can cause active window image AWG to be displayed on shared screen KM at the position corresponding to the position of active window image AWG displayed on terminal screen TM of each user's terminal, and it is therefore easy to intuitively recognize. As described above, image display system 5 enables images captured on a plurality of terminals 20 to be appropriately displayed on shared screen KM.

Display control device 30 may determine, for each active window image AWG, the display area of active window image AWG on shared screen KM on the basis of the image supplemental information corresponding to active window image AWG. When the display areas of a plurality of active window images AWG overlap each other on shared screen KM, display control device 30 may determine the display order of the plurality of active window images AWG along the direction perpendicular to shared screen KM according to the order of reception of the plurality of active window images AWG.

With this arrangement, image display system 5 can determine the display layers on shared screen KM according to the reception times of a plurality of active window images AWG from a plurality of terminals 20, for example. For example, when three active window images AWG are received, active window image AWG received last is displayed on the foremost side, active window image AWG received before last is displayed next to the foremost layer, and active window image AWG received first is displayed on the rearmost side.

The plurality of active window images AWG may include active window image AWGA (an example of a first image) and active window image AWGB (an example of a second image). When the display area of active window image AWGA and the display area of active window image AWGB overlap each other and active window image AWGA is received prior to active window image AWGB, display control device 30 may cause active window image AWGB to be display on the front side of active window image AWGA on shared screen KM.

With this arrangement, a newly received active window image AWGB is disposed on the front side, and the previously received active window image AWGA is disposed on the back side. Therefore, image display system 5 enables the newly received image to be easily recognized by a user.

The plurality of active window images AWG may include a third image that is an image of a window of a play application. The image supplemental information may include information indicating a play state of the application. Display control device 30 may determine, for each active window image AWG, a display area of active window image AWG on shared screen KM on the basis of the image supplemental information corresponding to active window image AWG. When the image supplemental information includes, as the play state of the application, information indicating that pause is released and the display area of the third image and the display areas for another image overlap each other, display control device 30 may cause the third image to be displayed on the front side of the other image on shared screen KM.

With this arrangement, active window image AWG of the application whose play has been paused can be displayed on the back side, supposing that active window image AWG is less important for the user to view and therefore is low in priority to be displayed. On the other hand, because active window image AWG of the application that has been released from pause and started to be played is important for the user to view, image display system 5 can display active window image AWG on the front side of shared screen KM, supposing that active window image AWG is high in priority to be displayed. Therefore, even when a plurality of active window images AWG are on shared screen KM, the user can easily recognize active window image AWG related to the application that has resumed play.

The plurality of active window images AWG may include a fourth image. Terminal 20 may obtain a change operation on the fourth image on terminal screen TM. Terminal 20 may transmit information of the change operation to display control device 30. Display control device 30 may determine, for each active window image AWG, a display area of active window image AWG on shared screen KM on the basis of the image supplemental information corresponding to active window image AWG. When the display areas of a plurality of active window images AWG overlap each other on shared screen KM, display control device 30 may determine the display order of the plurality of active window images AWG along the direction perpendicular to shared screen KM according to a reception timing of the information of the change operation on the fourth image.

This arrangement enables image display system 5 to perform the following operation. Image display system 5 handles, as a window image to be displayed in high priority, active window image AWG on which a user performs, on terminal screen TM, a change operation such as movement, change of size, switching, so that image display system 5 can display active window image AWG on the front side of shared screen KM. Therefore, even when a plurality of active window images AWG are on shared screen KM, the user can easily recognize active window image AWG on which a change operation has been performed.

Display control device 30 may obtain the information of at least one of the aspect ratio and the resolution of terminal screen TM. Display control device 30 may obtain the information of at least one of the aspect ratio and the resolution of shared screen KM. Display control device 30 may adjust the display area of window image WG on shared screen KM while maintaining the aspect ratio of window image WG (for example, active window image AWG) on terminal screen TM on the basis of at least one of the aspect ratio and the resolution of terminal screen TM and on at least one of the aspect ratio and the resolution of shared screen KM.

With this arrangement, even when the resolution or the aspect ratio is different between terminal screen TM and shared screen KM, image display system 5 enables screen-sharing between a plurality of users while maintaining the relative display area (position or size) of window image WG with respect to the screen.

Display control device 30 may adjust the display area of window image WG, in the x direction (an example of a first direction), on shared screen KM on the basis of lengths on terminal screen TM and shared screen KM. When a part of window image WG (for example, the lower end part) whose display area has been adjusted is not included in shared screen KM, display control device 30 may exclude the part of window image WG from a display object.

Even when the aspect ratio or the resolution is different between terminal screen TM and shared screen KM, window image WG disposed, for example, in the vicinity of an end part on terminal screen TM can be disposed out side the display area on shared screen KM. For example, on horizontally-oriented (longer in the x direction than in the y direction) shared screen KM, a part of the end part in the y direction (for example lower end part) can be outside the display area. Even in this case, a part of window image WG that is the display object is displayed while the other part is left outside the display area. Even in this case, the part of window image WG that is excluded from being displayed can be checked, for example, by being scrolled along the y direction.

Display control device 30 of the present exemplary embodiment includes display controller 302 that controls display device 40. Display controller 302 may obtain active window images AWG on terminal screens TM of a plurality of terminals 20, from each of the plurality of terminals 20 via wireless device 31. From each of the plurality of terminals 20, display controller 302 may obtain via wireless device 31 image supplemental information including image position information indicating the position of active window image AWG on terminal screen TM. Display controller 302 may determine, for each active window image AWG, a position of active window image AWG on shared screen KM of display device 40 on the basis of the image supplemental information corresponding to active window image AWG. Display controller 302 may cause the plurality of active window images AWG to be displayed at a plurality of positions determined on shared screen KM.

With the above arrangement, it is possible to share, between users checking shared screen KM, the information of the images displayed on terminal screens TM of other users by display control device 30 causing shared screen KM to display active window image AWG from each terminal 20. Further, each user can cause active window image AWG to be displayed on shared screen KM at the position corresponding to the position of active window image AWG displayed on terminal screen TM of each user's terminal, and it is therefore easy to intuitively recognize. As described above, display control device 30 enables the images captured on a plurality of terminals 20 to be appropriately displayed on shared screen KM.

(Circumstances Leading Up to a Second Exemplary Embodiment)

In an image display system, when images are transmitted from a plurality of terminals to a display device to be displayed, an effective communication speed may drop because of a limited bandwidth of a transmission path, for example, when a large number of terminals are connected to the display device. Further, a large number of images cannot be processed in some cases because of limited performance of a CPU on the display control device or the like. In this case, there is a possibility of freeze of image, frame dropping, and other issues occurring on a display screen of the display device. PTL 1 does not consider this issue.

In the following, a description will be given on an example of an image display system or the like in which images captured by a plurality of terminals are transmitted to a display device at an appropriate transmission rate and are appropriately displayed on a display screen of the display device.

Second Exemplary Embodiment

In the second exemplary embodiment, a description will be given on transmission of a window image on each of terminal screens of a plurality of terminals from the terminals to a display control device, where the window image is to be displayed on a shared screen of a display device. Note that, in the present exemplary embodiment, similarly to the first exemplary embodiment, an image display system determines a position of each window image on a shared screen on the basis of each piece of image supplemental information from each terminal, and displays each window image on each determined position. In the present exemplary embodiment, regarding disposition of a window image and a display order of window images, a description will be omitted or briefly given. Further, in the second exemplary embodiment, regarding items similar to those described in the first exemplary embodiment, a description will be omitted or briefly given.

A configuration of image display system 5A according to the second exemplary embodiment is almost the same as the configuration of image display system 5 shown in FIG. 1, and similar components will not be described or will be briefly described. Comparing image display system 5A of the present exemplary embodiment with image display system 5 of the first exemplary embodiment, a configuration to realize transmission rate control is different, and a configuration of the display control device is therefore different.

Note that, in the first exemplary embodiment, it has been mainly exemplified that active window image AWG is transmitted from terminal 20 to display control device 30 and is displayed on shared screen KM. In the second exemplary embodiment, window image WG other than active window image AWG may be transmitted and be displayed on shared screen KM. Window image WG transmitted by terminal 20 to the display control device may be any window image WG and may be window image WG specified via operation unit 220 by a user or active window image AWG. Further, a plurality of window images WG may be transmitted and displayed on shared screen KM.

Figure 14:
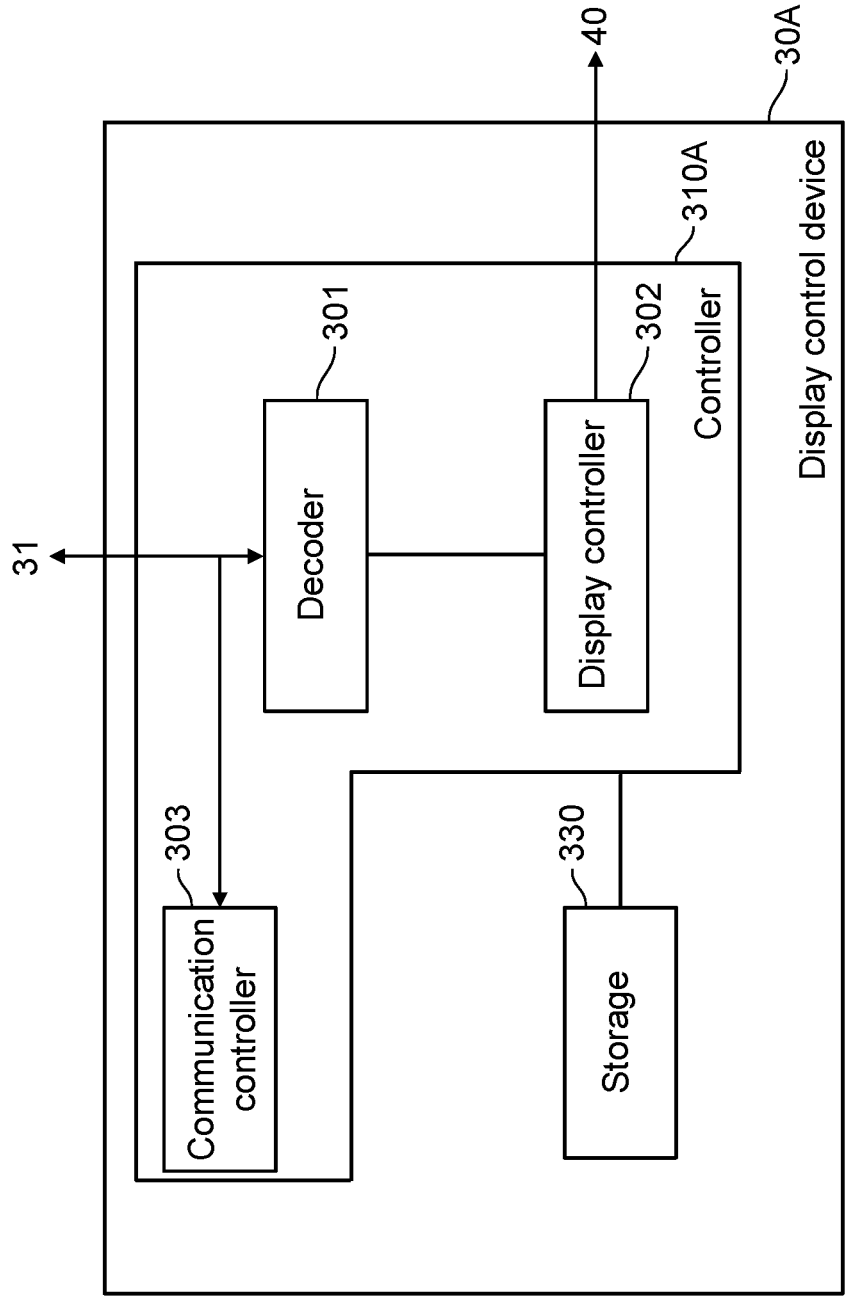
FIG. 14 is a block diagram showing a configuration example of a display control device according to a second exemplary embodiment.

FIG. 14 is a block diagram showing a configuration example of display control device 30A. Image display system 5A includes display control device 30A. Display control device 30A includes controller 310A. Controller 310A includes decoder 301, display controller 302, and communication controller 303. Note that, in display control device 30A of FIG. 14, components similar to the components of display control device 30 shown in FIG. 3 are assigned the same reference marks and will not be described or will be briefly described.

In display control device 30A, communication controller 303 obtains each window image WG and each piece of image supplemental information from each terminal 20 via wireless device 31 and decoder 301.

Communication controller 303 determines a transmission rate for transmitting each window image WG from each terminal 20 on the basis of the image supplemental information. When determining the transmission rates, communication controller 303 determines a ranking order of transmission rates for transmitting window images WG, and then determines the transmission rates on the basis of the ranking order of transmission rates. In this case, communication controller 303 may calculates screen coverage ratios on the basis of the image supplemental information. The screen coverage ratio represents a proportion of an area where window image WG is displayed on shared screen KM.

For example, communication controller 303 calculates display area where window image WG is displayed on shared screen KM, on the basis of image position information included in the image supplemental information. When a plurality of window images WG on shared screen KM from a plurality of terminals 20 do not overlap each other, the proportion of each display area to shared screen KM is each screen coverage ratio. The entire area of each window image WG is shown on the foreground (foremost side) of shared screen KM. On the other hand, when display areas of a plurality of window images WG from a plurality of terminals 20 overlap each other on shared screen KM, a proportion of the area, of each window image WG, shown on the foremost side to shared screen KM (the area that is not hidden behind any other window image and is shown) is each screen coverage ratio.

Communication controller 303 calculates each transmission rate for transmitting each window image WG (WGA, WGB, WGC, . . . ) from each terminal 20 on the basis of the screen coverage ratio of each window image WG. For example, when the screen coverage ratio of window image WGA is twice the screen coverage ratio of window image WGB, the transmission rate of window image WGA may be doubled, and the transmission rate may be determined by adding other adjustment to the doubled rate. Communication controller 303 notifies each determined transmission rate to each terminal 20 via wireless devices 31, 11, 21. Further, a plurality of different transmission rates may be previously determined and held in storage 330. For example, transmission rates of 20 fps, 5 fps, 1 fps, or other frame rates may be held in a table in storage 330, and a higher translation rate value will be assigned to window image WG having a higher screen coverage ratio. Further, the transmission rate may be frequency of transmission of an image per unit time (frame rate). When controlling the transmission rate, communication controller 303 controls the frequency of transmission of an image but does not have to control image quality of an image (for example, compression ratio).

Each terminal 20 receives the notification of the determined transmission rate from display control device 30A via wireless device 21. After receiving the notification of the transmission rate, each terminal 20 transmits window image WG to display control device 30A via wireless device 21 at the frequency of transmission according to the notified transmission rate.

Note that when a display mode of shared screen KM is set in a sharing mode, communication controller 303 controls the transmission rate. On the other hand, when the display mode of shared screen KM is set in a single mode (for example full-screen display mode), communication controller 303 does not have to control the transmission rate. Because transmitted window image WG is only window image WG from one terminal 20 when the display mode is set in the single mode, transmission of window images WG from other terminals 20 does not have to be considered.

Figure 15:
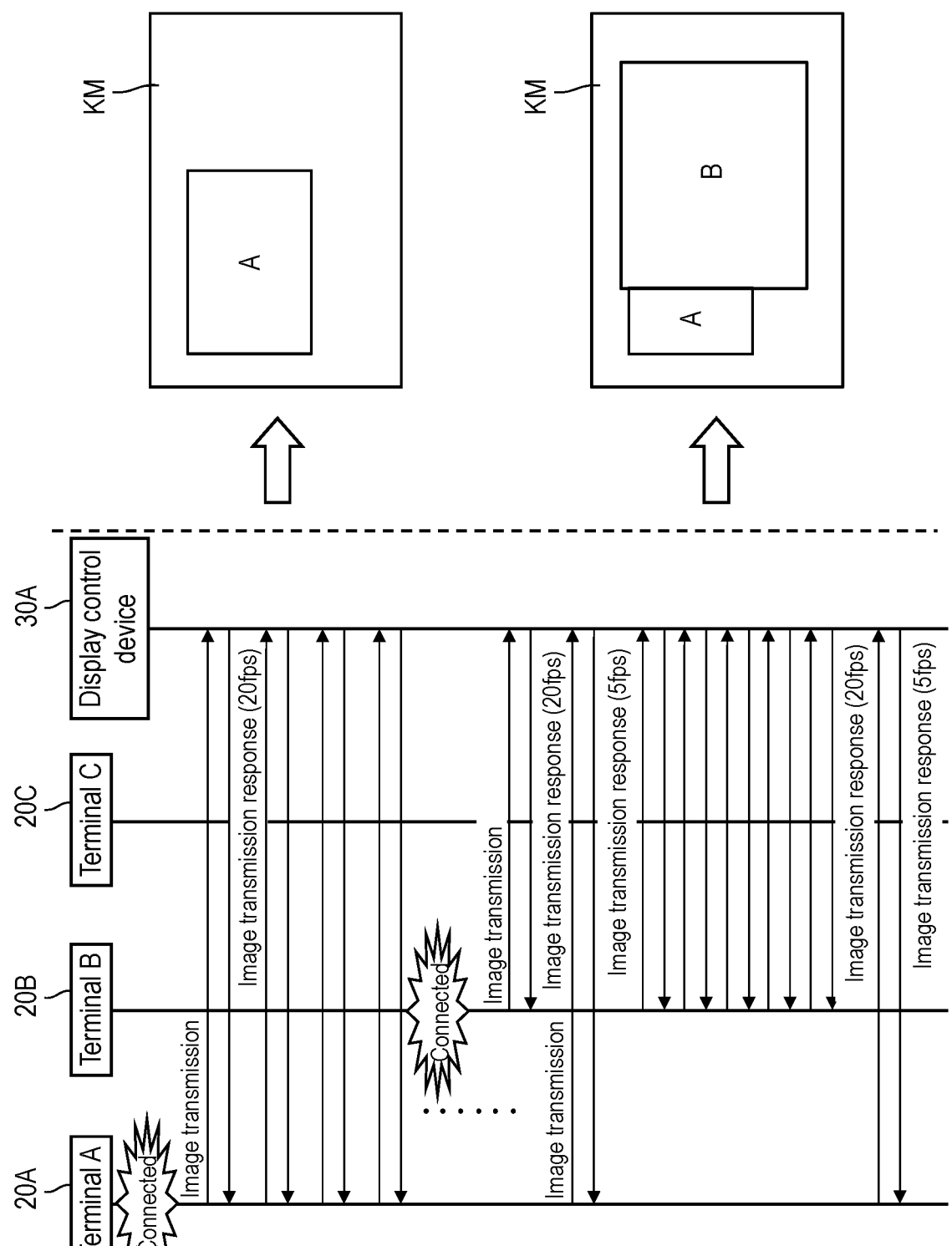
FIG. 15 is a diagram showing an example of image transmission and an example of screen-sharing according to the second exemplary embodiment.
Figure 16:
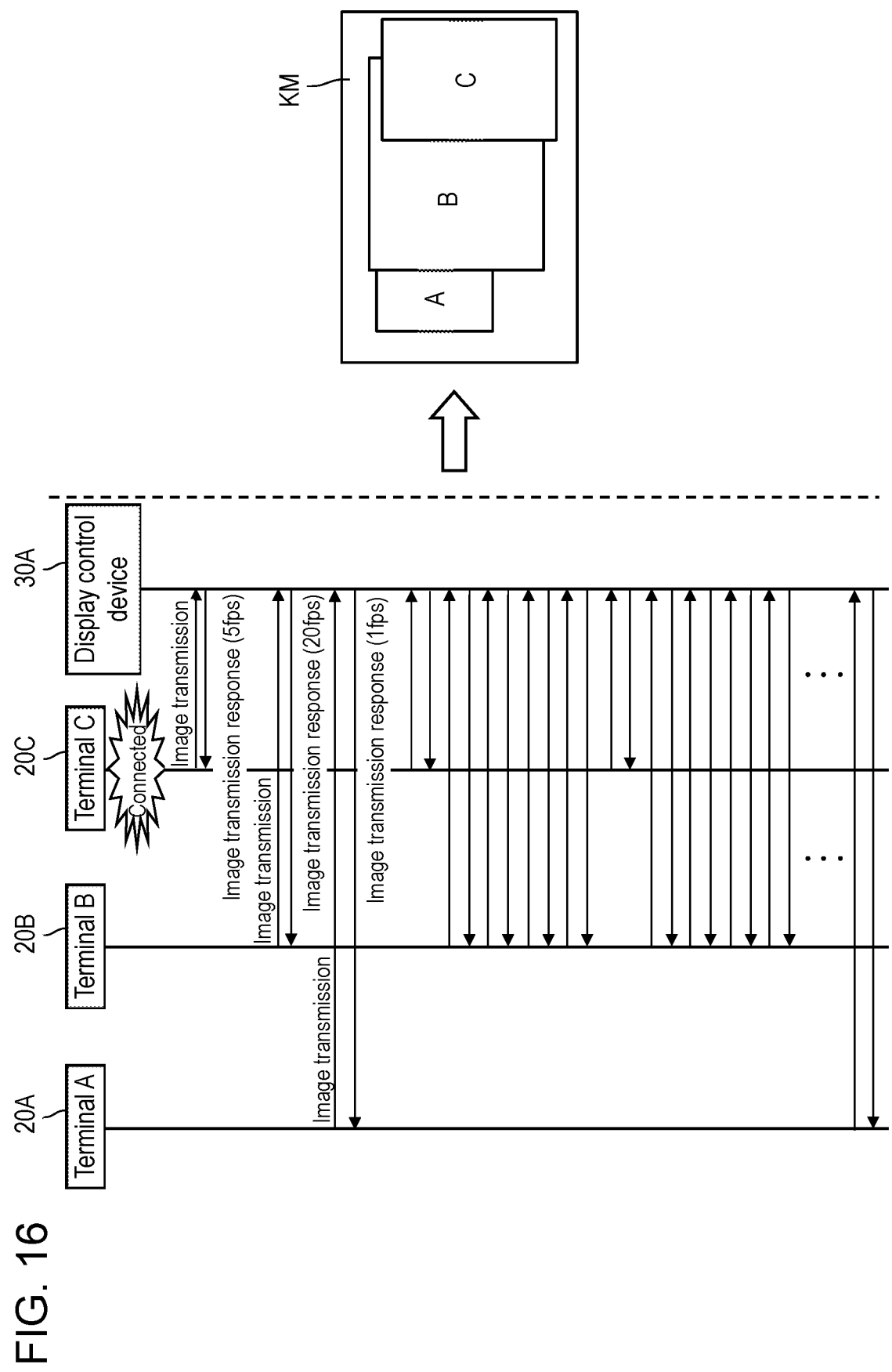
FIG. 16 is a diagram showing an example of image transmission and an example of screen-sharing according to the second exemplary embodiment.

FIGS. 15 and 16 are drawings each showing an example of image transmission and an example of screen-sharing of the present exemplary embodiment. With reference to FIGS. 15 and 16, the same processes as in FIG. 6 will not be described or will be briefly described. With reference to FIGS. 15 and 16, window image WGA (also simply referred to as "A" in the drawing) is transmitted from terminal 20A and is displayed on shared screen KM. Window image WGB (also simply referred to as "B" in the drawing) is transmitted from terminal 20B and is displayed on shared screen KM. Window image WGC (also simply referred to as "C" in the drawing) is transmitted from terminal 20C and is displayed on shared screen KM. Regarding window images WGA, WGB, WGB, the sizes of the original images are in the order of window image WGB>window image WGC>window image WGA. In this case, in the order of terminals 20A, 20B, 20C, terminals 20A, 20B, 20C are communicably connected to display control device 30A, start sharing, and start to transmit window images WG.

First, when terminal 20A detects start of sharing, terminal 20A transmits window image WGA and the image supplemental information of window image WGA to display control device 30A via wireless device 21. Display control device 30A receives window image WGA and the image supplemental information of window image WGA from terminal 20A via wireless device 31. Communication controller 303 determines the position of window image WGA on shared screen KM on the basis of the image position information included in the image supplemental information, and causes window image WGA to be displayed at this position.

Communication controller 303 calculates the display area of window image WGA on shared screen KM on the basis of the image position information included in the image supplemental information, and then calculates the screen coverage ratio. In this case, since no other window image WG than window image WGA is displayed on shared screen KM, the screen coverage ratio of window image WGA is the highest. Communication controller 303 determines the transmission rate (for example, the transmissible maximum transmission rate such as 20 fps) on the basis of the calculated screen coverage ratio. Display control device 30A transmits response information (image transmission response) including information of the determined transmission rate for transmitting window image WGA, to terminal 20A via wireless device 31. Therefore, the response information can include an instruction to change the transmission rate.

Terminal 20A receives the response information from display control device 30A via wireless device 21 and repeatedly transmits window image WGA in accordance with the transmission rate (for example, 20 fps) included in the response information.

Subsequently, terminal 20B transmits window image WGB and the image supplemental information of window image WGB to display control device 30A via wireless device 21. Display control device 30A receives window image WGB and the image supplemental information of window image WGB from terminal 20B via wireless device 31. Communication controller 303 determines the position of window image WGB on shared screen KM on the basis of the image position information included in the image supplemental information, and causes window image WGB to be displayed at this position. Note that since window image WGB starts to be shared after window image WGA starts to be shared, when the display area of window image WGB and the display area of window image WGA overlap each other, window image WGB is disposed and displayed on the front side of window image WGA.

Communication controller 303 calculates the display area of window image WGB on shared screen KM on the basis of the image position information included in the image supplemental information, and then calculates the screen coverage ratio. Here, when the display area of window image WGB and the display area of window image WGA overlap each other on shared screen KM, the display area of window image WGA on the back side is decreased by the area where both images overlap each other. As a result, in FIG. 15, the screen coverage ratio of window image WGA is considerably smaller than the screen coverage ratio of window image WGB.

Communication controller 303 determines, on the basis of the calculated screen coverage ratios, the transmission rate (for example, 20 fps) for transmitting window image WGB and the transmission rate (for example, 5 fps) for transmitting window image WGA. That is, the transmission rate for transmitting window image WGB is higher than the transmission rate for transmitting window image WGA. Display control device 30A transmits the response information including information of the determined transmission rate for transmitting window image WGB, to terminal 20B via wireless device 31. Display control device 30A transmits the response information including information of the determined transmission rate for transmitting window image WGA, to terminal 20A via wireless device 31.

Terminal 20B receives the response information from display control device 30A via wireless device 21 and repeatedly transmits window image WGB in accordance with the transmission rate (for example, 20 fps) included in the response information. Terminal 20A receives the response information from display control device 30A via wireless device 21 and repeatedly transmits window image WGA in accordance with the transmission rate (for example, 5 fps) included in the response information.

Subsequently, terminal 20C transmits window image WGC and the image supplemental information of window image WGC to display control device 30A via wireless device 21. Display control device 30A receives window image WGC and the image supplemental information of window image WGC from terminal 20C via wireless device 31. Communication controller 303 determines the position of window image WGC on shared screen KM on the basis of the image position information included in the image supplemental information, and causes window image WGC to be displayed at this position. Note that since window image WGC starts to be shared after window image WGB starts to be shared, when the display area of window image WGC and the display areas of window image WGB, WGA overlap each other, window image WGC is disposed and displayed on the front side of window images WGB, WGA. Further, as described above, window image WGB is disposed and displayed on the front side of window image WGA.

Communication controller 303 calculates the display area of window image WGC on shared screen KM on the basis of the image position information included in the image supplemental information, and then calculates the screen coverage ratio. Here, when the display area of window image WGC overlaps the display area of window images WGB, WGA on shared screen KM, the display area of window images WGB, WGA on the back side is decreased by the area where window images WGB, WGA overlap window image WGC. Further, as described above, when the display area of window image WGB and the display area of window image WGA overlap each other on shared screen KM, the display area of window image WGA on the back side is decreased by the area where window image WGA and window image WGB overlap each other. As a result, the screen coverage ratio is large in the order of window images WGB, WGC, WGA in FIG. 16.

Communication controller 303 determines the transmission rate (for example, 5 fps) for transmitting window image WGC, the transmission rate (for example, 20 fps) for transmitting window image WGB, and the transmission rate (for example, 1 fps) for transmitting window image WGA on the basis of the calculated screen coverage ratios. That is, the transmission rate for transmitting each window image (ranking order of transmission rate) is high in the order of window images WGB, WGC, WGA Display control device 30A transmits the response information including information of the determined transmission rate for transmitting window image WGC, to terminal 20C via wireless device 31. Display control device 30A transmits the response information including information of the determined transmission rate for transmitting window image WGB, to terminal 20B via wireless device 31. Display control device 30A transmits the response information including information of the determined transmission rate for transmitting window image WGA, to terminal 20A via wireless device 31.

Terminal 20C receives the response information from display control device 30A via wireless device 21 and repeatedly transmits window image WGC in accordance with the transmission rate (for example, 5 fps) included in the response information. Terminal 20B receives the response information from display control device 30A via wireless device 21 and repeatedly transmits window image WGB in accordance with the transmission rate (for example, 20 fps) included in the response information. Terminal 20A receives the response information from display control device 30A via wireless device 21 and repeatedly transmits window image WGA in accordance with the transmission rate (for example, 1 fps) included in the response information.

As described above, in image display system 5A, terminal 20A is first communicably connected to display control device 30A, and sharing is started. Then, terminal 20A transmits window image WGA, for example, at 20 fps, and display control device 30A displays window image WGA on shared screen KM. Subsequently, terminal 20B is communicably connected to display control device 30A, and sharing is started. In this case, the screen coverage ratio of window image WGB is larger than the screen coverage ratio of window image WGA. As an example, display control device 30A causes window image WGB to be transmitted, for example, at 20 fps and causes window image WGB to be displayed on shared screen KM. Further, display control device 30A causes window image WGA to be transmitted, for example, at 5 fps and causes window image WGA to be displayed on shared screen KM.

Subsequently, terminal 20C is communicably connected to display control device 30A, and sharing is started. The screen coverage ratio in this case is large in the order of window image WGB, window image WGC, and window image WGA. As an example, display control device 30A causes window image WGC to be transmitted, for example, at 5 fps and causes window image WGC to be displayed on shared screen KM. Further, display control device 30A causes window image WGB to be transmitted, for example, at 20 fps and causes window image WGB to be displayed on shared screen KM. Further, display control device 30A causes window image WGA to be transmitted, for example, at 1 fps and causes window image WGA to be displayed on shared screen KM.

As described above, each terminal 20 transmits data of window image WG on its own terminal screen TM to display control device 30A. Display control device 30A receives each window image WG from each terminal 20 and causes received window images WG to be displayed on shared screen KM. Each terminal 20 and display control device 30A set the transmission rate for transmitting window image WG from each terminal 20 to display control device 30A, depending on transmission conditions including the screen coverage ratio of each window image WG on shared screen KM.

Note that terminals 20A, 20B, 20C may transmit the image supplemental information not only when an image is transmitted for the first time after starting of sharing (that is, when sharing is started) but any time. Terminal 20 transmits the image supplemental information to display control device 30A via wireless device 21, for example, when each terminal 20 is communicably connected to display control device 30A or when window image WG on terminal screen TM of each terminal 20 is changed. The changing of window image WG may include movement of a window, change of size of a window, switching active windows, and the like. The change of window image WG may be automatically performed or manually performed (by a user operation via operation unit 220). Further, each terminal 20 may transmit the image supplemental information to display control device 30A via wireless device 21 together with window image WG every time each terminal 20 sends window image WG. Communication controller 303 of display control device 30A obtains the image supplemental information from each terminal 20 via wireless device 31.

When communication controller 303 has received the image supplemental information, communication controller 303 may calculate the screen coverage ratio of window image WG, corresponding to the received image supplemental information, on shared screen KM on the basis of the image supplemental information. Therefore, the more frequently the image supplemental information is transmitted, the more frequently the screen coverage ratio is calculated, and display control device 30A can adjust the transmission rate accordingly frequently. In this case, even when display forms of a plurality of window images WG on shared screen KM change frequently, display control device 30A can derive appropriate transmission rates.

As described above, image display system 5A can control transmission rates for transmitting each window image WG on the basis on the screen coverage ratio of each window image WG on shared screen KM. As a result, even when a large number of terminals 20 are connected to display control device 30A, image display system 5A can control occurrence of freeze of shared screen KM and frame drop (missing of image frame) due to a drop of the effective communication speed between each terminal 20 and display control device 30A. In particular, since the transmission rate is determined depending on the screen coverage ratio, image display system 5A can set the communication speed and the frame rate for transmitting, for example, important window image WG higher than the communication speed and the frame rate for transmitting other window images WG so that occurrence of freeze and frame drop of shared screen KM can be reduced. Specifically, by using the screen coverage ratio, image display system 5A can increase the transmission rate to increase a transmission amount of window image WG, of a plurality of window images WG, having a larger area where window image WG is exposed on the foreground of shared screen KM, supposing that such window image WG is more important information.

Therefore, on the transmission path between, for example, terminals 20, wireless control device 10, and display control device 30A, image display system 5A can control short of resources for transmitting an important window image WG (having a high screen coverage ratio, for example) and control deterioration of characteristics of the transmission path caused by a plurality of window images WG being transmitted equally at an excessive transmission amount.

In the present exemplary embodiment, display control device 30A may readjust the transmission rate on the basis of the wireless communication condition included in the image supplemental information. For example, after communication controller 303 once determines the transmission rates on the basis of the screen coverage ratios or the like, communication controller 303 may lower the transmission rate when the wireless communication condition of terminal 20 for which the transmission rate has been determined to be high is poor (for example, the quality is less than or equal to a predetermined quality). With this arrangement, display control device 30A can control unexpected freeze and frame dropping. In addition, there is generated an allowance in the resources of display device 40 by the amount by which the transmission rate for such terminal 20 has been lowered; therefore, by assigning the allowance in the resources to the other terminals 20, it is possible to improve the communication quality of whole image display system 5A.

In the present exemplary embodiment, it has been mainly exemplified that the transmission rates are determined (including determination of the ranking order of transmission rates) on the basis of the screen coverage ratios, but the present disclosure is not limited to this example. For example, communication controller 303 of display control device 30A may obtain the image supplemental information other than the screen coverage ratios or may obtain terminal information about terminals 20, and may determine the transmission rate on the basis of the image supplemental information or the terminal information. Further, the transmission rate may be determined on the basis of both the screen coverage ratio and either the image supplemental information or the terminal information. Note that when the screen coverage ratio or the image supplemental information is identical for a plurality of window images WG, the same transmission rate may be set for the plurality of window images WG.

For example, communication controller 303 may determine the transmission rate, depending on the number of terminals 20 that are simultaneously connected to display control device 30A. For example, the larger the number of terminals 20 is, the lower the transmission rate for transmission from each terminal 20 is set. The smaller the number of terminals 20 is, the higher the transmission rate for transmission from each terminal 20 is set. Note that, for example, the number of terminals 20 may be managed by wireless device 31 and may be obtained from wireless device 31. The number of the terminals may be included in the terminal information.

Communication controller 303 may determine the transmission rate on the basis of a type of the application of the transmission object window (for example, the active window) on terminal 20. The transmission rate may be set as follows, for example. When the application of the transmission object window is a video application, the transmission rate for transmitting transmission object window image WG is set high. When the application of the transmission object window is an application not for video (for example, for still image or text edit), the transmission rate for transmitting transmission object window image WG may be set low. The information of the application may be included in the image supplemental information and may be notified to display control device 30A from terminal 20.

Communication controller 303 may determine the transmission rate, depending on a role of the user using terminal 20 (for example, owner, presenter, or clerk of a meeting). For example, when the user of terminal 20 is presenter, the transmission rate for transmitting window image WG from such terminal 20 may be set high, and when the user of terminal 20 is clerk, the transmission rate for transmitting a window image from such terminal 20 may be set low. The information of the user's role may be included in the image supplemental information and may be notified to display control device 30A from terminal 20.

Communication controller 303 may determine the transmission rate according to an order of the instructions to start sharing or a reception order of a plurality of window images WG transmitted from a plurality of terminals 20. For example, the later in time the order of the instruction to start sharing or the order of reception is, the higher the transmission rate may be set, and the earlier in time the order of the instruction to start sharing or the order of reception is, the lower the transmission rate may be set. With this arrangement, the transmission rate of a new image, which is supposed to gather much attention, is set high.

Figure 17:
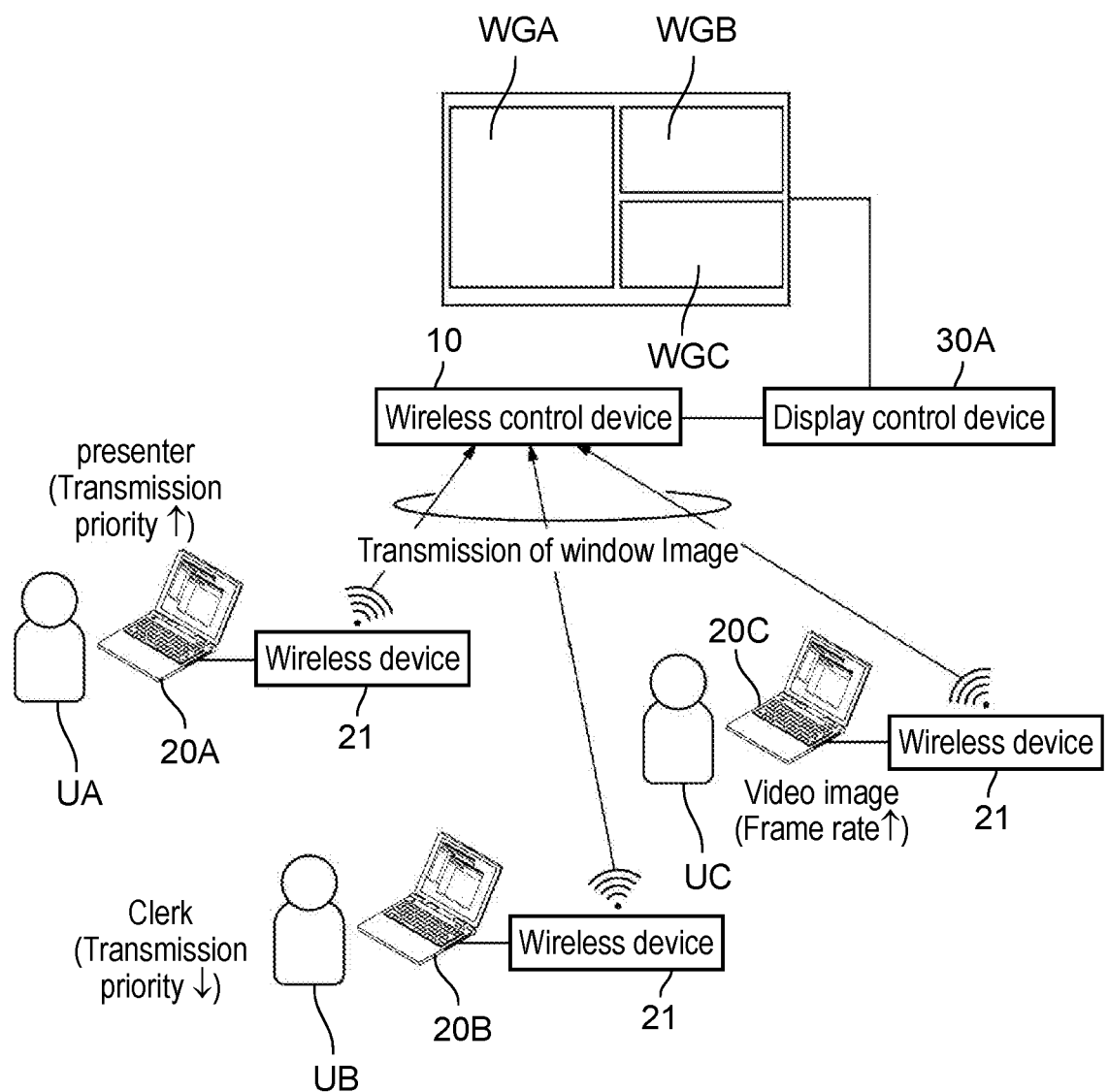
FIG. 17 is a diagram additionally describing image transmission by an image display system according to the second exemplary embodiment.

FIG. 17 is a diagram additionally describing image transmission by image display system 5A according to the second exemplary embodiment.

With reference to FIG. 17, the type of user UA of terminal 20A is presenter, and the type of user UB of terminal 20B is clerk. Therefore, communication controller 303 may determine the transmission rates on the basis of the types of the users included in the image supplemental information from terminals 20A, 20B. In this case, communication controller 303 may set the transmission rate of window image WGA transmitted from terminal 20A high and may set the transmission rate of window image WGB transmitted from terminal 20B low.

On terminal 20C, a window of a video application is selected as a transmission object window (for example, the active window). Therefore, communication controller 303 may determine the transmission rate on the basis of the type of the application included in the image supplemental information from terminal 20C. In this case, communication controller 303 may set the transmission rate of window image WGC transmitted from terminal 20C higher than the transmission rate for transmitting a window image of, for example, a still image application.

Although, in the present exemplary embodiment, it has been mainly described that the transmission rate is controlled but the image quality of window image WG to be transmitted is not controlled, the present disclosure is not limited to this example. Communication controller 303 may control the image quality of window image WG to be transmitted. The image quality here may be a compression ratio of JPEG, which is one of compression methods for window image WG. Alternatively, instead of the transmission rate for transmission from terminal 20 to display control device 30, a communication rate assigned to terminal 20 may be controlled. Note that the information of the image quality and the frame rate may be notified from display control device 30A to terminal 20.

The ranking order of transmission rates may be changed depending on start, stop, or pause of play of an application (for example, video application) by terminal 20, or stop of screen-sharing, or the like. When such a trigger that changes the ranking order of transmission rates has occurred, communication controller 303 may set the transmission rate. For example, supposing that images of a video are being transmitted as window image WG from one of terminals 20, when window images WG are added to the screen-sharing from other terminals 20, window image WG of the video is moved toward the back side on shared screen KM in succession. In this case, when an operation on the video application is performed on terminal screen TM, for example, via operation unit 220, the ranking order of transmission rate is raised, and image display system 5A can improve the transmission performance for transmitting window image WG of the video application.

As described above, image display system 5A (an example of an image transmission system) of the present exemplary embodiment includes: a plurality of terminals 20 each including terminal screen TM (an example of a first screen); and display control device 30A (an example of a transmission control device) that controls transmission of an image to be displayed on display device 40 including shared screen KM (an example of a second screen). Terminal 20 may transmit window image WG (an example of an image of a window) on terminal screen TM to display control device 30A. Display control device 30A may receive a plurality of window images WG from the plurality of terminals 20. Display control device 30A may obtain the image supplemental information about window images WG or terminal information about terminals 20 and may determine ranking order of transmission rates of the plurality of window images WG from the plurality of terminals 20 to display control device 30A on the basis of the image supplemental information or the terminal information.

With this arrangement, image display system 5A can determine the ranking order of transmission rates for transmitting window images WG and can control the transmission rates on the basis of the image supplemental information about window images WG or the terminal information about terminals 20. As a result, image display system 5A can control occurrence of freeze of shared screen KM and frame drop (missing of image frame) caused by a drop of an effective communication speed between each terminal 20 and display control device 30A.

Terminal 20 may transmit the image supplemental information including the image position and the image size of window image WG on terminal screen TM to display control device 30A. Display control device 30A may receive a plurality of pieces of the image supplemental information from a plurality of terminals 20. Display control device 30A may derive (for example, calculate), for each window image WG, a screen coverage ratio of window image WG to shared screen KM on the basis of the image supplemental information corresponding to each window image WG, and may determine the ranking order of transmission rates of a plurality of window images WG on the basis of the screen coverage ratio of each window image WG.

By using the screen coverage ratio, image display system 5A can increase the transmission rate to increase a transmission amount of window image WG, of a plurality of window images WG, having a larger area where window image WG is exposed on the foreground of shared screen KM, supposing that such window image WG is more important information. Further, when a large number of terminals 20 are connected to display control device 30A, a large number of window images WG are displayed on shared screen KM, and the screen coverage ratio for one window image WG is therefore small. As a result, image display system 5A can control occurrence of freeze of shared screen KM and frame drop (missing of image frame) caused by a drop of an effective communication speed between each terminal 20 and display control device 30A. Further, image display system 5A can determine the image position and the image size of window image WG on shared screen KM on the basis of the image position and the image size of window image WG on terminal screen TM, so that positional relations of displayed window images WG on the screens can be maintained. Therefore, by grasping the image position information on terminal screen TM, display control device 30A can derive the screen coverage ratio on shared screen KM.

Terminal 20 may transmit the image supplemental information including the information of a role of a user of terminal 20 to display control device 30A. Display control device 30A may receive a plurality of pieces of the image supplemental information from a plurality of terminals 20. Display control device 30A may determine the ranking order of transmission rates of a plurality of window images WG on the basis of the role of the user included in the image supplemental information.

With this arrangement, image display system 5A can set the transmission rate high, for example, for a presenter required to show many materials or videos for a presentation, and can set the transmission rate low for a clerk who mainly edits text or the like, so that image display system 5A can transmit images from terminals 20 according to each role.

The terminal information may include information of the number of terminals 20 connected to display control device 30A. Display control device 30A may determine the ranking order of transmission rates of a plurality of window images WG on the basis of the number of terminals 20.

With this arrangement, when, for example, a large number of terminals 20 are connected to display control device 30A to share screens, image display system 5A can perform adjustment such as equally decreasing the transmission rates for terminals 20. Therefore, image display system 5A can control deterioration of the image transmission performance stemming from the number of terminals 20.

Terminal 20 may transmit to display control device 30A the image supplemental information including the information of a type of an application corresponding to window image WG. Display control device 30A may receive a plurality of pieces of the image supplemental information from a plurality of terminals 20. Display control device 30A may determine the ranking order of transmission rates of a plurality of window images WG on the basis of the type of the application included in the image supplemental information.

With this arrangement, image display system 5A can set the transmission rate high for the transmission of window image WG of an application (for example, a video application) whose data volume is supposed to be large and can set the transmission rate low for window image WG of an application (for example, a text-editing application) whose data volume is supposed to be small. Therefore, image display system 5A can control deterioration of the image transmission performance stemming from the type of the application corresponding to window image WG.

The window may be an active window. Specifically, window image WG may be active window image AWG.

With this arrangement, image display system 5A can improve the image transmission performance of important window image WG that is paid attention on terminal screen TM by the user of each terminal 20, so that active window images AWG can be smoothly screen-shared.

The control of the transmission rate may include the control of frequency of transmission of window image WG.

With this arrangement, image display system 5A can transmit images, adjusting the transmission amount per unit time without changing the image quality of each single window image WG.

The control of the transmission rate may include the control of image quality of window image WG.

With this arrangement, image display system 5A can transmit images, adjusting the transmission amount per unit time without changing frequency of transmission.

Display control device 30A may enable any one of a plurality of window images WG on shared screen KM to be full-screen displayed. Display control device 30A may determine the ranking order of transmission rates of the plurality of window images WG in a period when full-screen display is not performed.

When full-screen display is performed, no other image than the image to be full-screen displayed is displayed on shared screen KM; therefore, no other image has to be transmitted from terminal 20 to display control device 30A. As a result, image display system 5A can reduce resources of the transmission path while maintaining the display quality on shared screen KM.

Display control device 30A may cause a plurality of received window images WG to be displayed on shared screen KM.

With this arrangement, display control device 30A can perform, on one device, the control of the transmission rates (determination of the ranking order of transmission rates) and the display control of shared screen KM.

Display control device 30A of the present exemplary embodiment includes communication controller 303 (an example of a transmission controller) that controls the transmission of window image WG to be displayed on display device 40. Communication controller 303 may obtain window images WG on terminal screens TM equipped on a plurality of terminals 20, from each of a plurality of terminals 20. Communication controller 303 may obtain the image supplemental information about window image WG or terminal information about terminal 20 and may determine the ranking order of transmission rates of the plurality of window images WG from the plurality of terminals 20 to display control device 30A on the basis of the image supplemental information or the terminal information.

With this arrangement, display control device 30A can determine the ranking order of transmission rates for transmitting window images WG and can control the transmission rates on the basis of the image supplemental information about window images WG or the terminal information about terminals 20. As a result, display control device 30A can control occurrence of freeze of shared screen KM and frame drop (missing of image frame) caused by a drop of the effective communication speed between each terminal 20 and display control device 30A.

Various exemplary embodiments have been described above with reference to the drawings, but there is no need to say that the present disclosure is not limited to such examples. It is apparent that those skilled in the art can conceive various variations or modifications within the scope described in the attached claims, and those variations or modifications are obviously understood to be in the technical scope of the present disclosure. In addition, the components in the above exemplary embodiments may be arbitrarily combined without departing from the spirit of the present disclosure.

The scope of the above-mentioned present disclosure may include such a program as described below and a recording medium storing the program. The program realizes a function of a method for controlling transmission according to the above-described exemplary embodiments. The program is provided to an information processing device (transmission control device), which is a computer, via a network or various storage media, and the program is read out and executed by a processor of the information processing device.

In the above exemplary embodiment, the processor may be configured in any physical manner. Further, when a programmable processor is used, contents of processing can be modified by modifying a program, and the processor can therefore be developed more freely. The processor may be configured with one semiconductor chip or may be configured with a plurality of physical semiconductor chips. When configured with a plurality of physical semiconductor chips, separate semiconductor chips may perform the controls in the above exemplary embodiments. In this case, it is considered that the plurality of semiconductor chips constitute one processor. Further, the processor may be configured with a semiconductor chip and other members (such as capacitors) having different functions. Further, one semiconductor chip may be configured so as to realize functions of a processor and other functions. Further, a plurality of processors may be constituted by one processor.

In the above exemplary embodiments, it has been exemplified that display control device 30, 30A and display device 40 are separate bodies, but display control device 30, 30A and display device 40 may be integrally configured.

The present disclosure is useful for an image display system, a display control device, a method for controlling display, and the like that enable images captured on a plurality of terminals to be displayed appropriately.

What is claimed is:

1. An image display system comprising:
   a plurality of terminals each having a first screen; and
   a display control device that controls a display device including a second screen,
   wherein the plurality of terminals each transmit to the display control device an image of an active window on the first screen and image supplemental information including image position information indicating a position of the image on the first screen, and
   the display control device
   receives the image and the image supplemental information,
   determines a position of the image on the second screen based on the image supplemental information,
   causes the image to be displayed at the position determined on the second screen,
   adjusts a display area of the image on the second screen, based on lengths in a first direction on the first screen and the second screen, and
   excludes, when a part of the image for which the display area has been adjusted is not included in the second screen, the part of the image from a display object.

2. The image display system according to claim 1, wherein the display control device
    determines the display area of the image on the second screen, based on the image supplemental information, and
    determines a display order of a plurality of images along a direction perpendicular to the second screen according to a reception order of the plurality of images when display areas of the plurality of images that are each the image transmitted from each of the plurality of terminals overlap each other on the second screen.

3. The image display system according to claim 2, wherein the plurality of images include a first image and a second image,
    the display control device causes the second image to be displayed on a front side of the first image on the second screen when a display area of the first image and a display area of the second image overlap each other and the first image is received prior to the second image.

4. The image display system according to claim 1, wherein a plurality of images that are each the image transmitted from each of the plurality of terminals include a third image that is an image of a window of a playable application,
    a terminal of the plurality of terminals that transmits the third image obtains, as a play state of the playable application, information indicating that pause has been released, and transmits to the display control device the third image whose pause has been released and the image supplemental information including the information indicating that pause has been released,
    the display control device
    determines a display area of each of the plurality of images on the second screen, based on the image supplemental information, and
    causes the third image to be displayed on a front side of the other image on the second screen when a display area of the third image and a display area of another image overlap each other.

5. The image display system according to claim 1, wherein a plurality of images that are each the image transmitted from each of the plurality of terminals include a fourth image,
    a terminal of the plurality of terminals that transmits the fourth image obtains a change operation performed on the fourth image on the first screen, and transmits to the display control device the fourth image to which the change operation has been performed and the image supplemental information including information of the change operation, and
    the display control device
    determines, based on the image supplemental information, a display area of each of the plurality of images on the second screen, and
    determines a display order of the plurality of images along a direction perpendicular to the second screen according to a reception timing of the information of the change operation on the fourth image when the display areas of the plurality of images overlap each other on the second screen.

6. The image display system according to claim 1, wherein the display control device
    obtains information of at least one of an aspect ratio and a resolution of the first screen,
    obtains information of at least one of an aspect ratio and a resolution of the second screen, and
    adjusts the display area of the image on the second screen, based on at least one of the aspect ratio and the resolution of the first screen and on at least one of the aspect ratio and the resolution of the second screen, while maintaining the aspect ratio of the image on the first screen.

7. The image display system according to claim 1, wherein the image position information includes an image position and an image size on the first screen.

8. A display control device comprising a display controller that controls a display device, wherein the display controller
    obtains from each of a plurality of terminals an image of an active window on a first screen of each of the plurality of terminals and image supplemental information including image position information indicating a position of the image on the first screen,
    determines a position of the image on a second screen of the display device based on the image supplemental information,
    causes the image to be displayed at the position determined on the second screen,
    adjusts a display area of the image on the second screen, based on lengths in a first direction on the first screen and the second screen, and
    excludes, when a part of the image for which the display area has been adjusted is not included in the second screen, the part of the image from a display object.

9. A method for controlling display of an image by a display device, the method comprising:
    obtaining from each of a plurality of terminals an image of an active window on a first screen of each of the plurality of terminals and image supplemental information including image position information indicating a position of the image on the first screen;
    determining a position of the image on a second screen of the display device based on the image supplemental information;
    causing the image to be displayed at the position determined on the second screen;
    adjusting a display area of the image on the second screen, based on lengths in a first direction on the first screen and the second screen; and
    excluding, when a part of the image for which the display area has been adjusted is not included in the second screen, the part of the image from a display object.

* * * * *